US011187028B2

(12) United States Patent
Trpkovski

(10) Patent No.: US 11,187,028 B2
(45) Date of Patent: Nov. 30, 2021

(54) FILLING AND SEALING DEVICE AND METHOD FOR AN INSULATED GLASS UNIT

(71) Applicant: PDS IG Holding LLC, Prairie du Sac, WI (US)

(72) Inventor: Paul Trpkovski, Kailua Kona, HI (US)

(73) Assignee: PDSD IG Holding LLC, Prairie Du Sac, WI (US)

( * ) Notice: Subject to any disclaimer, the term of this patent is extended or adjusted under 35 U.S.C. 154(b) by 348 days.

(21) Appl. No.: 16/024,786

(22) Filed: Jun. 30, 2018

(65) Prior Publication Data

US 2019/0003246 A1 Jan. 3, 2019

Related U.S. Application Data

(60) Provisional application No. 62/528,089, filed on Jul. 1, 2017.

(51) Int. Cl.
*E06B 3/677* (2006.01)
*E06B 3/673* (2006.01)
*E06B 3/66* (2006.01)

(52) U.S. Cl.
CPC .......... *E06B 3/6775* (2013.01); *E06B 3/6612* (2013.01); *E06B 3/67304* (2013.01); *E06B 2003/67378* (2013.01)

(58) Field of Classification Search
CPC .................................................. E06B 3/6775
See application file for complete search history.

(56) References Cited

U.S. PATENT DOCUMENTS 2,756,467 A 7/1956 Etling et al.
4,780,164 A 10/1988 Rueckheim et al.
(Continued)

FOREIGN PATENT DOCUMENTS

CA 2909224 10/2014
EP 0056762 7/1982
(Continued)

OTHER PUBLICATIONS

File History for related U.S. Appl. No. 15/398,459 downloaded Aug. 13, 2018 (217 pages).
(Continued)

*Primary Examiner* — Philip C Tucker
*Assistant Examiner* — John Blades
(74) *Attorney, Agent, or Firm* — Pauly, DeVries Smith & Deffner LLC

(57) ABSTRACT

Methods for manufacturing insulating glass units (IGUs) include providing an unsealed IGU assembly that has first and second sheets of glass material and at least one spacer frame between the first and second sheets and sealed to at least one of the first and second sheets. The unsealed IGU assembly defines an interpane space and an IGU passage providing fluid communication between the interpane space and an environment external to the interpane space. In some cases the method includes positioning a filling device next to the IGU passage and introducing a gas into the interpane space through the IGU passage using the filling device. In some cases the method includes delivering a sealing material or sealing structure to the IGU passage with the filling device to seal the interpane space. Corresponding systems for manufacturing IGUs are also provided.

14 Claims, 15 Drawing Sheets

(56) References Cited

U.S. PATENT DOCUMENTS

| | | | |
|---|---|---|---|
| 4,886,095 | A | 12/1989 | Lisec |
| 4,909,874 | A | 3/1990 | Rueckheim et al. |
| 5,017,252 | A | 5/1991 | Aldrich et al. |
| 5,080,146 | A | 1/1992 | Arasteh |
| 5,110,337 | A | 5/1992 | Lisec et al. |
| 5,139,595 | A * | 8/1992 | Taylor .................. E06B 3/6775 156/104 |
| 5,149,799 | A | 9/1992 | Rubens et al. |
| 5,366,574 | A | 11/1994 | Lenhardt et al. |
| 5,413,156 | A | 5/1995 | Lisec |
| 5,454,893 | A | 10/1995 | Dietz et al. |
| 5,573,618 | A | 11/1996 | Rueckheim |
| 5,626,712 | A | 5/1997 | Lisec |
| 5,753,069 | A | 5/1998 | Rueckheim |
| 5,957,169 | A | 9/1999 | Trpkovski et al. |
| 6,068,720 | A | 5/2000 | Mchugh et al. |
| 6,158,483 | A | 12/2000 | Trpkovski et al. |
| 6,216,751 | B1 | 4/2001 | Trpkovski |
| 6,916,392 | B2 | 7/2005 | Trpkovski et al. |
| 8,381,382 | B2 | 2/2013 | Wunnicke et al. |
| 8,627,856 | B2 | 1/2014 | Mchugh et al. |
| 8,821,662 | B2 | 9/2014 | Mader |
| 8,905,085 | B2 | 12/2014 | Donohue |
| 10,968,685 | B2 | 4/2021 | Trpkovski |
| 2002/0197422 | A1 * | 12/2002 | Trpkovski ............... B23B 51/02 428/34 |
| 2012/0151857 | A1 | 6/2012 | Heikkila et al. |
| 2014/0109499 | A1 | 4/2014 | Nieminen et al. |
| 2014/0290156 | A1 | 10/2014 | Bruce et al. |
| 2015/0184447 | A1 | 7/2015 | Queck et al. |
| 2017/0191305 | A1 | 7/2017 | Trpkovski |
| 2017/0299121 | A1 | 10/2017 | Trpkovski |
| 2019/0003244 | A1 | 1/2019 | Trpkovski |
| 2019/0003245 | A1 | 1/2019 | Trpkovski |
| 2020/0392781 | A1 | 12/2020 | Trpkovski |

FOREIGN PATENT DOCUMENTS

| | | |
|---|---|---|
| WO | 2014169253 | 10/2014 |
| WO | 2017120236 | 7/2017 |

OTHER PUBLICATIONS

File History for related U.S. Appl. No. 15/640,512 downloaded Aug. 13, 2018 (330 pages).

"Insulated Glazing," retrieved from Wikipedia.com on Aug. 13, 2018 (4 pages). URL <https://en.wikipedia.org/w/index.php?title=Insulated_glazing&oldid=853408716>.

"International Preliminary Reporton Patentability," for PCT Application No. PCT/US2017/012188 dated Jul. 19, 2018 (10 pages).

"International Search Report and Written Opinion," for PCT Application No. PCT/US2017/012188 dated Mar. 16, 2017 (12 pages).

"Understanding Insulating Glass Units," Vitro Architectural Glass accessed online at URL <vitrowindowglass.com/window_glass/understanding_IGU.aspx> on Dec. 23, 2015 (1 page).

"Non-Final Office Action," for U.S. Appl. No. 15/640,512 dated Jun. 17, 2020 (12 pages).

"Response to Communication Pursuant to Rules 161 (2) and 162 EPC," for European Patent Application No. 17736260.5 filed Feb. 14, 2019 (10 pages).

"European Search Report," for European Patent Application No. 17736260.5 dated Sep. 3, 2019 (8 pages).

"Non-Final Office Action," for U.S. Appl. No. 15/398,459 dated Sep. 3, 2019 (20 pages).

"Non-Final Office Action," for U.S. Appl. No. 15/640,512 dated Sep. 6, 2019 (16 pages).

"Final Office Action," for U.S. Appl. No. 15/398,459 dated Jan. 6, 2020 (9 pages).

"Final Office Action," for U.S. Appl. No. 15/640,512 dated Jan. 7, 2020 (11 pages).

"Response to European Search Report," for European Patent Application No. 17736260.5 filed Mar. 17, 2020 (17 pages).

"Response to Non Final Office Action," for U.S. Appl. No. 15/398,459, filed on Dec. 2, 2019 (9 pages).

"Response to Non Final Office Action," for U.S. Appl. No. 15/640,512, filed on Apr. 7, 2020 (10 pages).

"Response to Non Final Office Action," for U.S. Appl. No. 15/640,512, filed on Dec. 4, 2019 (10 pages).

"Notice of Allowance," for U.S. Appl. No. 15/640,512 dated Dec. 8, 2020 (15 pages).

"Response to Non Final Office Action," for U.S. Appl. No. 16/024,778, filed on Dec. 4, 2020 (10 pages).

"Response to Non Final Office Action," for U.S. Appl. No. 16/024,780, filed on Dec. 4, 2020 (8 pages).

"Non-Final Office Action," for U.S. Appl. No. 16/024,780 dated Oct. 1, 2020 (23 pages).

"Non-Final Office Action," for U.S. Patent Application No. 824.0012USU1 dated Sep. 24, 2020 (24 pages).

"Response to Non-Final Rejection," dated Jun. 17, 2020 for U.S. Appl. No. 15/640,512, submitted via EFS-Web on Sep. 11, 2020, 7 pages.

"Final Office Action," for U.S. Appl. No. 16/024,778 dated Mar. 16, 2021 (14 pages).

"Final Office Action," for U.S. Appl. No. 16/024,780 dated Mar. 16, 2021 (14 pages).

"Response to Final Office Action" for U.S. Appl. No. 16/024,778, filed on Jun. 15, 2021 (14 pages).

* cited by examiner

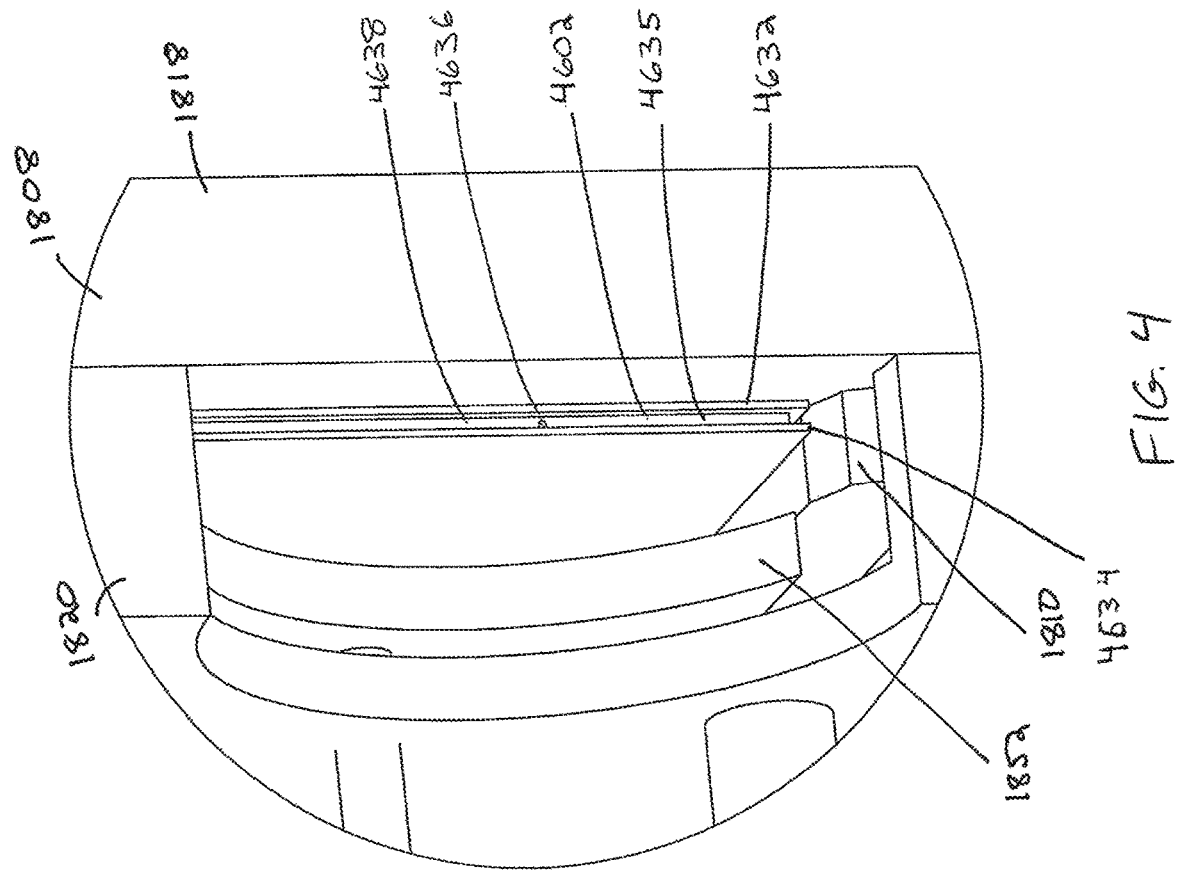
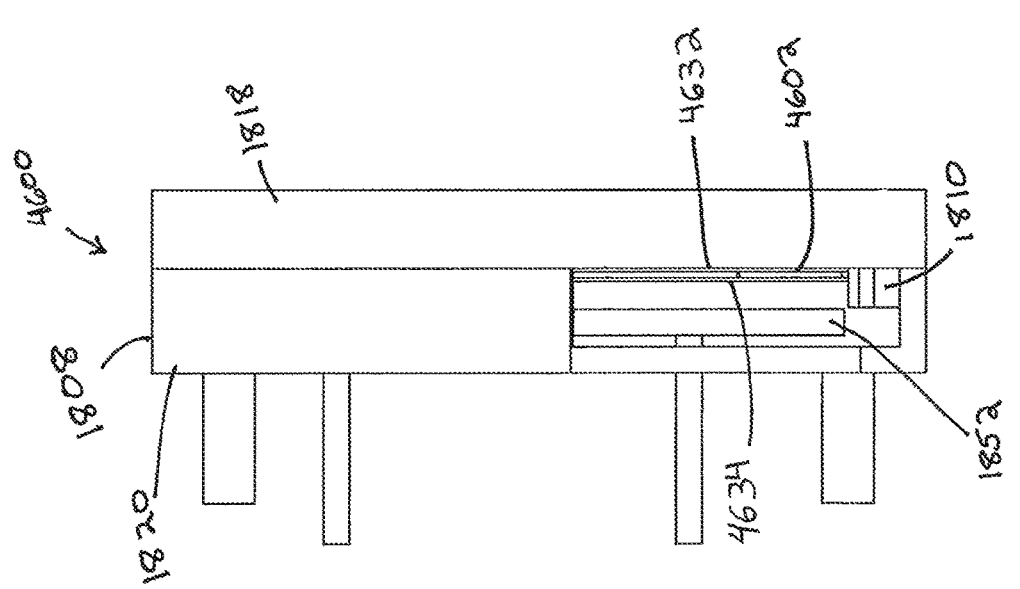

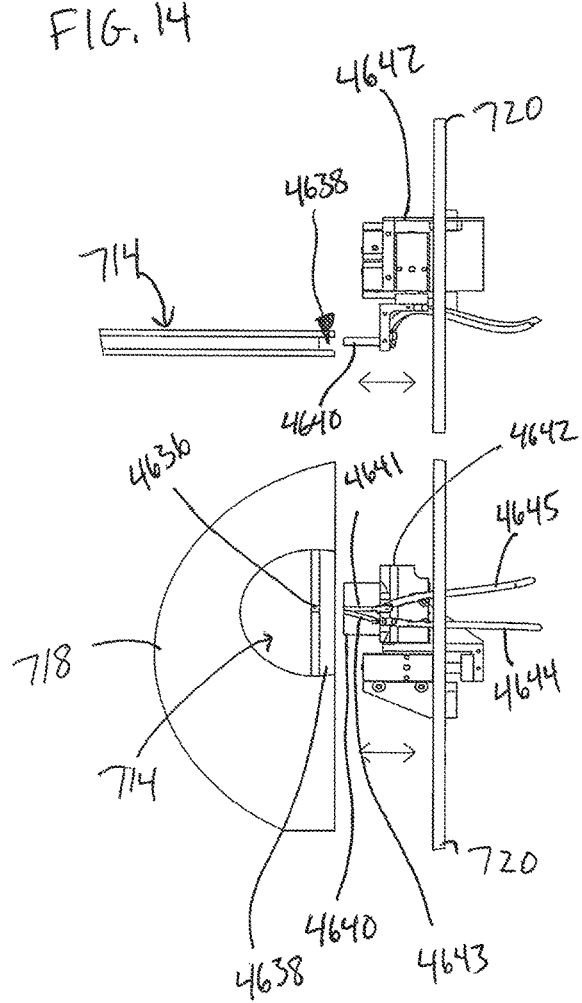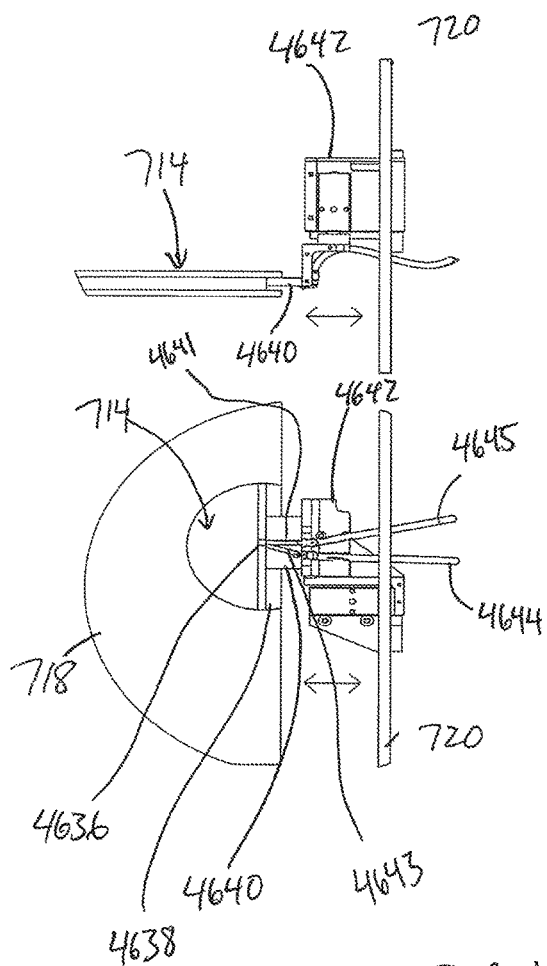

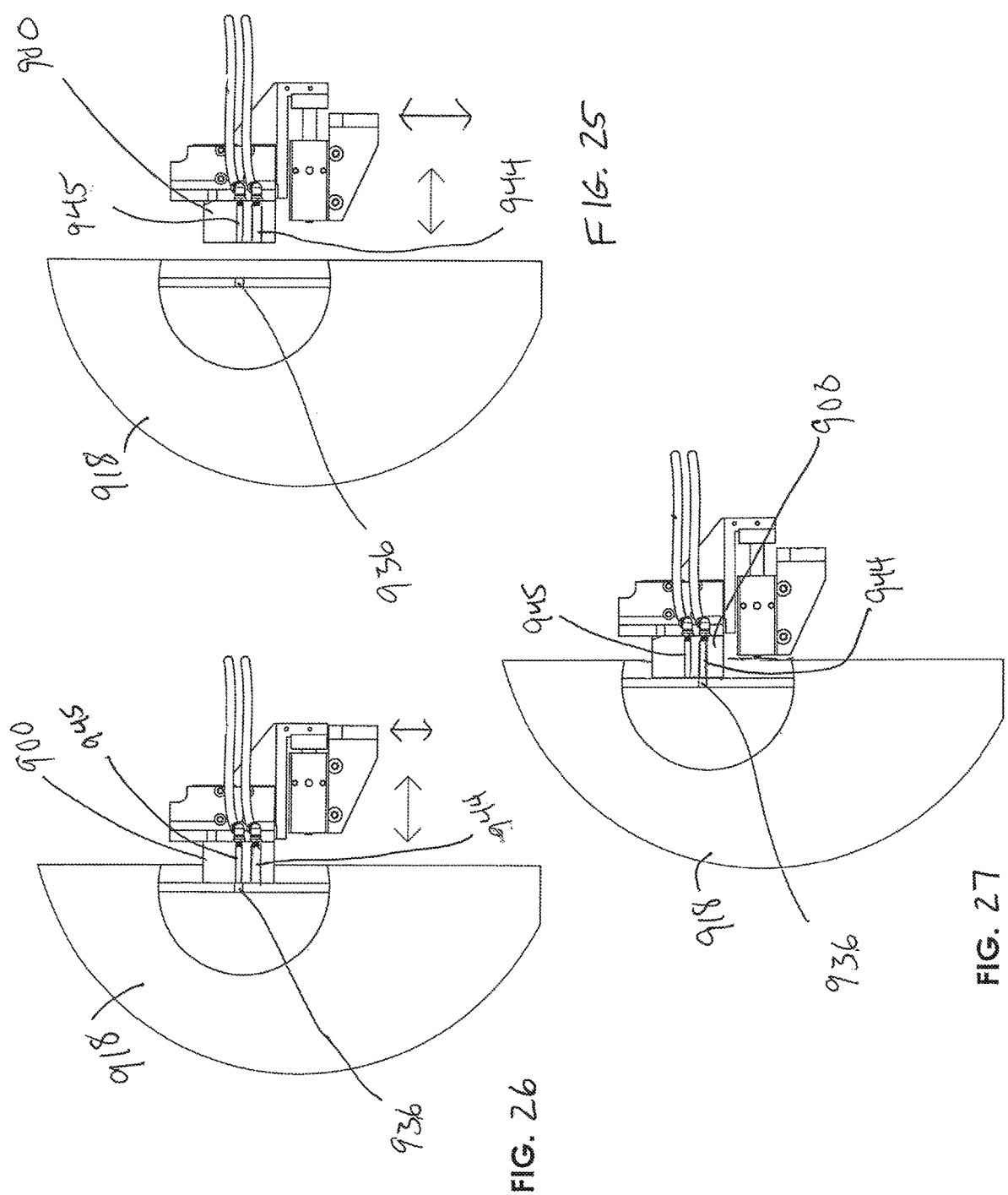

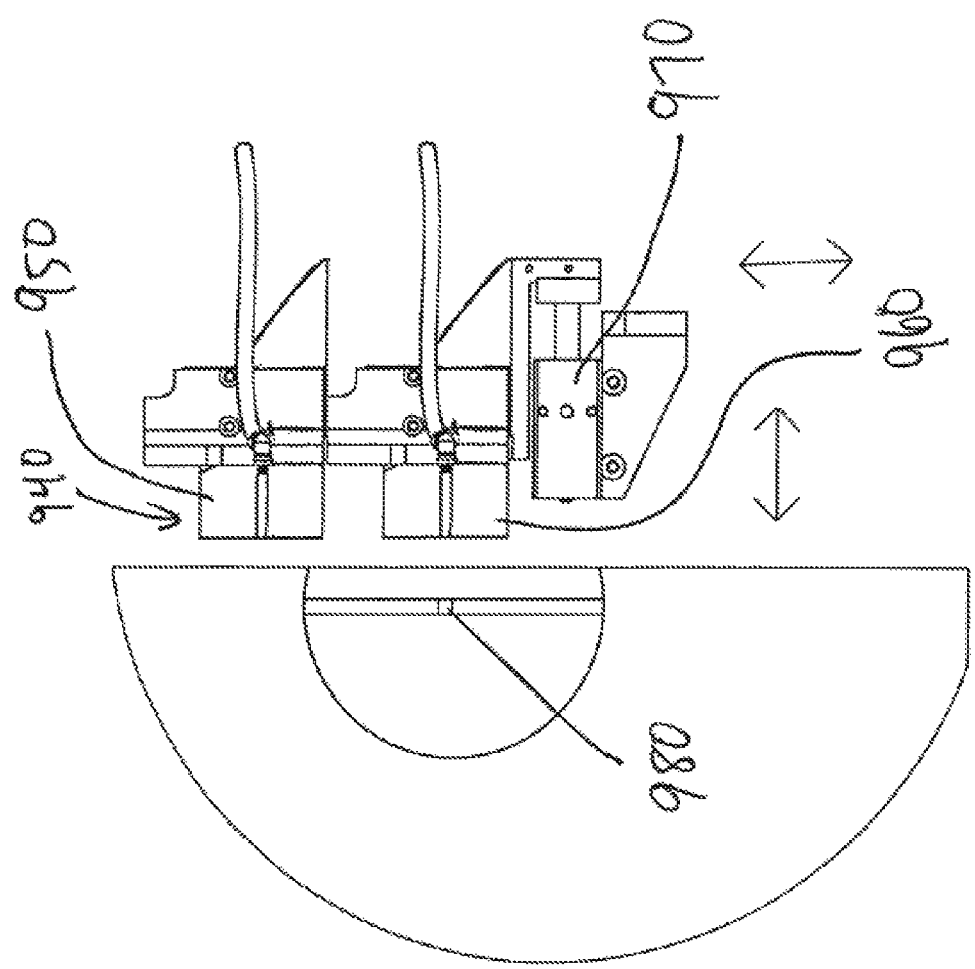

FILLING AND SEALING DEVICE AND METHOD FOR AN INSULATED GLASS UNIT

CROSS-REFERENCE TO RELATED APPLICATIONS

This application claims the benefit of U.S. Provisional Application No. 62/528,089, filed Jul. 1, 2017, the content of which is herein incorporated by reference in its entirety.

This application is related to U.S. Provisional Application No. 62/528,082, filed Jul. 1, 2017, and to a nonprovisional application claiming priority therefrom, titled "Gas Filling Assembly Machine and Method for an Insulated Glass Unit," and being filed on Jun. 30, 2018, the even date herewith (hereinafter "the'11 application"). The contents of U.S. Provisional Application No. 62/528,082 and the'11 application are incorporated herein by reference in their entireties.

This application is also related to U.S. Provisional Application No. 62/528,083, filed Jul. 1, 2017, and to a nonprovisional application claiming priority therefrom, titled "No-Chamber Gas Filling for an Insulated Glass Unit," and being filed on Jun. 30, 2018, the even date herewith (hereinafter "the'12 application"). The contents of U.S. Provisional Application No. 62/528,083 and the'12 application are incorporated herein by reference in their entireties.

This application is also related to U.S. application Ser. No. 15/640,512, filed on Jul. 1, 2017 (now U.S. Publ. No. 2017/0299121, hereinafter "the CIP application"), which is a continuation-in-part of prior U.S. application Ser. No. 15/398,459, filed Jan. 4, 2017, which claims the benefit of U.S. Provisional Application No. 62/274,676, filed Jan. 4, 2016, each of the contents of which are herein incorporated by reference in their entireties.

FIELD OF THE TECHNOLOGY

The present application relates to filling an insulating glass unit. More specifically, the present application relates to filling an insulating glass unit with a gas within an enclosure.

BACKGROUND

In recent years, there has been an increased awareness of energy usage and conservation. As a result many governing bodies have released energy standards and regulations for buildings and construction materials. These standards and regulations frequently require more energy efficient systems and components.

One specific area of focus includes more efficient windows and doors. Many governing bodies have passed regulations that require windows and doors to have a minimum insulating value to limit the amount of energy lost through windows and doors. As a result, window and door manufacturers have needed to find ways to increase the insulating properties of their products. The materials and techniques used to produce more insulated windows and doors have resulted in an increased cost to manufacture the windows and doors.

Some techniques and systems have been developed to fill glass units with one or more insulating gases. For example, U.S. Pat. No. 8,627,856 discloses a method and apparatus wherein the insulating gases are supplied to gas filling tubes that are inserted into one or more interpane spaces of the insulating glass units. Each interpane space may be filled with more than one insulating gas. A control unit controls the injection of the insulating gases in accordance with gas filling data received by the control unit.

SUMMARY

Embodiments disclosed herein include methods machines, and systems for at least one of assembling an insulating glass unit (IGU) and replacing air within an IGU interpane space with an interpane gas.

One general aspect includes a method of manufacturing a sealed insulating glass unit (IGU), including: providing an unsealed IGU assembly, the unsealed IGU assembly including first and second sheets of glass material and at least one spacer frame between the first and second sheets and sealed to at least one of the first and second sheets, the unsealed IGU assembly defining an interpane space and an IGU passage providing fluid communication between the interpane space and an environment external to the interpane space. The method also includes positioning a filling device next to the IGU passage. The method also includes introducing a gas into the interpane space through the IGU passage using the filling device. The method also includes delivering a sealing material or sealing structure to the IGU passage with the filling device to seal the interpane space.

Implementations may include one or more of the following features. The method where the sealing material or sealing structure is selected from the group including of sealant, a rivet, a patch, and tape. The method further including evacuating the interpane space before delivering a gas into the interpane space and before positioning the filling device next to the IGU passage. The method further including evacuating the interpane space before delivering a gas into the interpane space and after positioning the filling device next to the IGU passage, where the filling device is configured to evacuate the interpane space. The method where the unsealed IGU assembly is selected from the group including of a double pane unsealed IGU assembly and a triple pane unsealed IGU assembly. The method where the IGU passage is defined in one of the group including of the spacer frame, the first sheet of glass, and the second sheet of glass. The method further including drilling the IGU passage in the spacer frame. The method where providing an unsealed IGU assembly, positioning a filling device, introducing a gas, and delivering a sealing material or sealing structure occurs automatically within a sealed vacuum enclosure.

One general aspect includes a system for manufacturing a sealed insulating glass unit (IGU), including: a support structure configured to receive an unsealed IGU assembly, the unsealed IGU assembly including first and second sheets of glass material and at least one spacer frame between the first and second sheets and sealed to at least one of the first and second sheets, the unsealed IGU assembly defining an interpane space and an IGU passage providing fluid communication between the interpane space and an environment external to the interpane space. The system also includes a filling device defining a filling passage and being configured to introduce a gas into the interpane space through the IGU passage using the filling device and to deliver a sealing material or structure to the IGU passage with the filling device to seal the interpane space.

Implementations may include one or more of the following features. The system where the filling device includes a rigid conduit that is configured to provide a rivet including a base portion and a cap portion, where the rivet includes sealant material on a cap portion. The system where the filling device defines a single outlet configured to be sealed to the IGU passage of the unsealed IGU assembly, where the filling device further defines a gas inlet and a sealing material inlet, where the gas inlet and the sealing material inlet are both in communication with the single outlet. The system where the filling device defines: a gas inlet in communication with a gas outlet. The system may also include a sealing material inlet in communication with a sealing material outlet. The system may also include an actuator configured to shift the filling device between a disengaged position where the filling device is not in contact with an unsealed IGU assembly, a filling position where the gas outlet is positioned to introduce a gas into the interpane space through the IGU passage, and a sealing position where the filling device is positioned to seal to the IGU passage. The system where the filling device includes a gas seal head and a sealing material seal head, where the gas seal head is independent from the sealing material seal head.

One general aspect includes a system for manufacturing a sealed insulating glass unit (IGU), including: a vacuum enclosure defining an interior and having a support structure, the interior and support structure configured to receive an unsealed IGU assembly, the unsealed IGU assembly including first and second sheets of glass material and at least one spacer frame between the first and second sheets and sealed to at least one of the first and second sheets, the unsealed IGU assembly defining an interpane space and an IGU passage providing fluid communication between the interpane space and the interior of the vacuum enclosure. The system also includes a filling device within the vacuum enclosure and defining a filling passage, the filling device configured to be moved automatically to a first position next to the IGU passage and to introduce a gas into the interpane space through the IGU passage using the filling device. The system also includes where the system is further configured to deliver a sealing material or sealing structure to the IGU passage with the filling device to seal the interpane space within the vacuum enclosure.

Implementations may include one or more of the following features. The system where the sealing material or sealing structure is selected from the group including of sealant, a rivet, a patch, and tape. The system where the filling device includes a rigid conduit that is configured to provide a rivet including a base portion and a cap portion, where the rivet includes sealant material on a cap portion. The system where the filling device defines a single outlet configured to be sealed to the IGU passage of the unsealed IGU assembly, where the filling device further defines a gas inlet and a sealing material inlet, where the gas inlet and the sealing material inlet are both in communication with the single outlet. The system where the filling device defines: a gas inlet in communication with a gas outlet. The system may also include a sealing material inlet in communication with a sealing material outlet. The system may also include an actuator configured to shift the filling device between a disengaged position where the filling device is not in contact with an unsealed IGU assembly, a filling position where the gas outlet is positioned to introduce a gas into the interpane space through the IGU passage, and a sealing position where the filling device is positioned to seal to the IGU passage. The system where the filling device includes a gas seal head and a sealing material seal head, where the gas seal head is independent from the sealing material seal head. The system where the filling device is configured to automatically deliver the sealing material or sealing structure. The system where the unsealed IGU assembly is selected from the group including of a double pane unsealed IGU assembly and a triple pane unsealed IGU assembly. The system where the IGU passage is defined in the spacer frame.

According to an embodiment, a method of manufacturing a sealed insulating glass unit (IGU) includes providing an unsealed IGU assembly within a vacuum enclosure, the unsealed IGU assembly having first and second sheets of glass material and at least one spacer frame between the first and second sheets and sealed to at least one of the first and second sheets, the unsealed IGU assembly defining an interpane space and an IGU passage providing fluid communication between the interpane space and the interior of the vacuum enclosure. The method also includes evacuating air from the vacuum enclosure and the interpane space and automatically positioning a filling device next to the IGU passage within the vacuum enclosure. The method also includes introducing a gas into the interpane space through the IGU passage using the filling device and, within the vacuum enclosure, delivering a sealing material or sealing structure to the IGU passage to seal the interpane space.

This summary is an overview of some of the teachings of the present application and is not intended to be an exclusive or exhaustive treatment of the present subject matter. Further details are found in the detailed description and appended claims. Other aspects will be apparent to persons skilled in the art upon reading and understanding the following detailed description and viewing the drawings that form a part thereof, each of which is not to be taken in a limiting sense. The scope of the present application is defined by the appended claims and their legal equivalents.

BRIEF DESCRIPTION OF THE DRAWINGS

The technology may be more completely understood in connection with the drawings, in which:

FIGS. 3-8 are views showing steps in assembling an insulating glass unit assembly within an enclosure using a filling and sealing device, according to an embodiment.

FIG. 9 is a side view of an unsealed IGU assembly on a support structure between a first plate and an assembly plate, according to various embodiments.

FIG. 10 is a perspective view of an unsealed IGU assembly on a support structure between a first plate and an assembly plate, with a portion of the assembly plate cut away, and showing a filling device near the unsealed IGU assembly, according to various embodiments.

FIGS. 11 and 12 are a side view and a perspective, cut-away side view, respectively, of an IGU assembly on a support structure between a first plate and an assembly plate, with a filling device positioned to be in contact with an IGU passage in a spacer of the IGU assembly, according to various embodiments.

FIGS. 13-14 show assembly steps for a filling device, and actuator, an IGU, and a side part of a first portion of the vacuum enclosure, with the filling device positioned away from engagement with an IGU passage or hole in spacer frame, in various embodiments.

FIGS. 15-16 show the same components as FIGS. 13-14, but with the filling device contacting the spacer frame, so that the filling passage is in fluid communication with the hole in the spacer frame. The device can provide sealant to seal the IGU passage, according to various embodiments.

FIG. 22 shows a triple pane IGU assembly situated with a vacuum enclosure, ready for filling and sealing. FIG. 23 shows a filling device disengaged from a triple pane IGU assembly. FIG. 24 shows a filling device engaged with an IGU passage of a triple pane IGU assembly, according to various embodiments.

FIGS. 25-27 are schematic views of a filling device having a filling conduit separate from a sealing conduit, in which the device is in a disengaged position (FIG. 25), a filling position (FIG. 26), and a sealing position, respectively (FIG. 27), according to various embodiments.

FIG. 28 is a schematic view of a filling device having a filling head and a separate sealing head, according to various embodiments.

Figure 1:
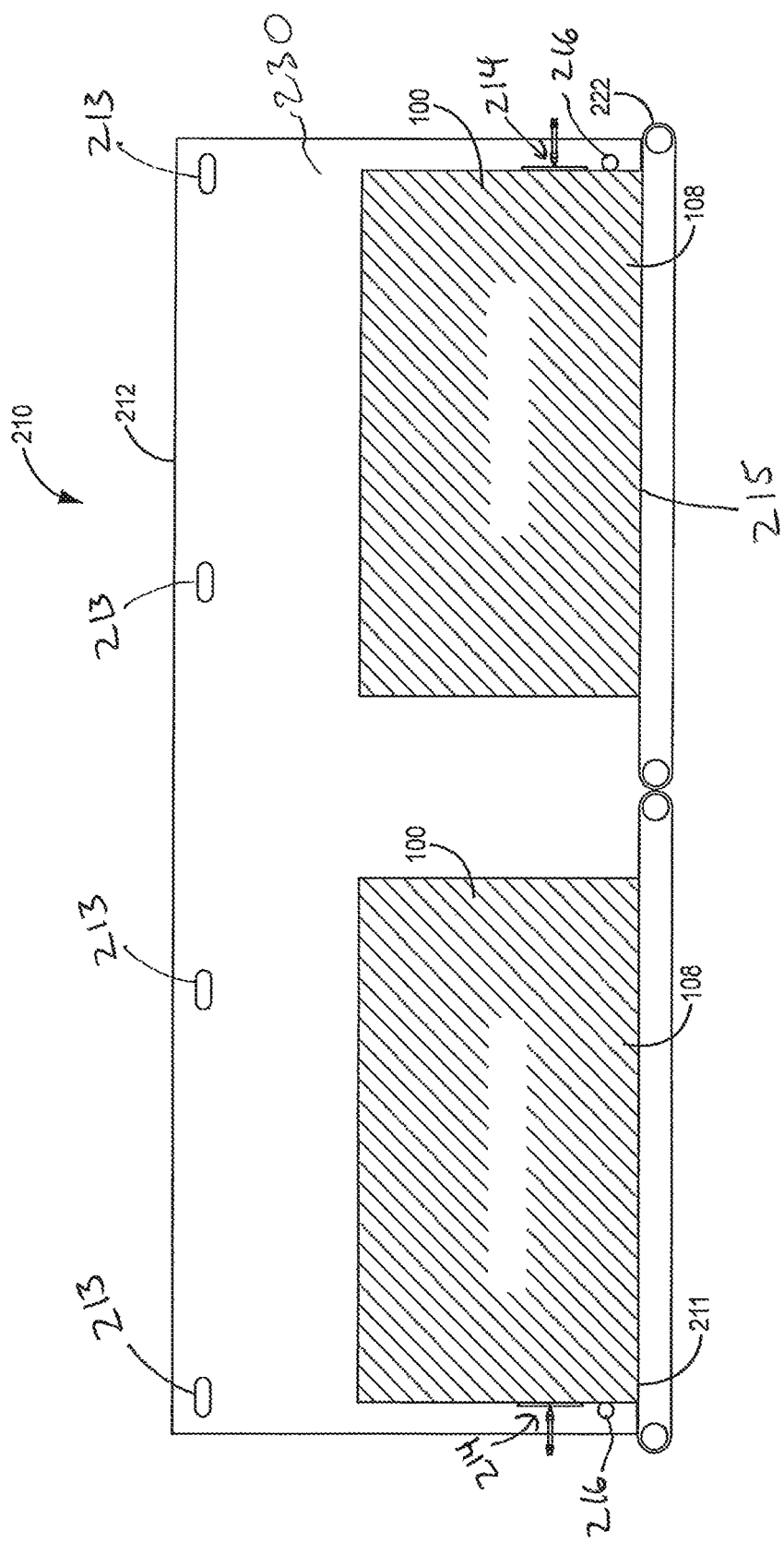
FIG. 1 is a front schematic representation of a system for assembling and filling an IGU with an interpane gas, with filling and sealing devices in an engaged position, according to various embodiments.

The drawings depict various embodiments of the methods described herein and corresponding machinery and structural components. In cases in which the figures are similar to or the same as the figures of the one of the applications that are incorporated by reference herein, the corresponding descriptions of the figures in that application can apply according to various embodiments.

While the technology is susceptible to various modifications and alternative forms, specifics thereof have been shown by way of example and drawings, and will be described in detail. It should be understood, however, that the application is not limited to the particular embodiments described. On the contrary, the application is to cover modifications, equivalents, and alternatives falling within the spirit and scope of the technology.

DETAILED DESCRIPTION

Windows that are installed in buildings and other structures frequently include an insulating glass unit surrounded by a frame. The insulating glass unit can include a first sheet of glass material and a second sheet of glass material. Some insulating glass units can further include a third sheet, such as a sheet of glass material. A spacer can separate the first sheet from the second sheet. The spacer can extend around the insulating glass unit near the perimeter of the insulating glass unit. The first sheet, second sheet, and spacer define an interpane space or volume that can be initially filled with air, such as air from the ambient environment of the manufacturing facility. In various embodiments, the air can be replaced with a different gas, such as to increase or affect the insulating properties of the window. Various different gases have different insulating properties. Some varieties of IGUs have a first sheet, second sheet, and an intermediate sheet between the first and second sheets, referred to as triple pane IGUs. In some examples, two portions of an interpane space of a triple pane IGU are in fluid communication with each other through an opening in the intermediate sheet.

Embodiments described herein relate to methods and machines for sealing an opening in a spacer or a first or second sheet in an insulating glass unit (IGU) after the interpane space is filled with a gas. Method implementations can begin with providing and/or positioning one or more components of an IGU inside a vacuum enclosure, also referred to herein as a vacuum chamber. Other implementations do not require a vacuum chamber for filling an IGU, such as the implementations described in the '12 application as well as many other implementations.

A method of manufacturing a sealed insulating glass unit (IGU) includes providing an unsealed IGU assembly, the unsealed IGU assembly defining an interpane space and an IGU passage providing fluid communication between the interpane space and the interior of the vacuum enclosure, wherein the IGU passage is defined in one of the first and second sheets or in the spacer frame. The method further includes positioning a filling device next to the IGU passage and introducing a gas into the interpane space through the IGU passage using the filling device. The method also includes delivering a sealing material to the IGU passage with the filling device to seal the interpane space.

A method of manufacturing a sealed insulating glass unit (IGU) includes providing an unsealed IGU assembly within a vacuum enclosure, the unsealed IGU assembly including first and second sheets of glass material and at least one spacer frame between the first and second sheets and sealed to at least one of the first and second sheets. The unsealed IGU assembly defines an interpane space and an IGU passage providing fluid communication between the interpane space and the interior of the vacuum enclosure. The IGU passage is defined in one of the sheets or in the spacer structure. The method includes evacuating air from the vacuum enclosure and the interpane space, automatically positioning a filling device next to the IGU passage within the vacuum enclosure, and introducing a gas into the interpane space through the IGU passage using the filling device. The method further includes delivering a sealing material to the IGU passage to seal the interpane space, where the delivering happens within the vacuum enclosure.

The manufacture of insulating glass units (IGUs) is generally a complex process that can involve large, expensive, and complex pieces of manufacturing equipment. In some cases the need to use multiple pieces of large manufacturing equipment necessitates a larger than desired installation footprint. For example, some IGU manufacturing processes can involve multiple machines and stations, which must be spread out across a plant. The number of pieces of equipment, and their spatial arrangement, can in some cases result in assembly lines that are longer than desired.

It is desirable to combine multiple operations on an IGU into a single station, such as an evacuation chamber or another type of station. Examples of operations include providing components, assembling components, filling the IGU's interpane space and sealing the interpane space. For example, one method of manufacturing a sealed IGU involves performing the filling and sealing step while the unsealed IGU is present at a single station, such as a vacuum enclosure. In one example, the filling and sealing operations can both be performed by a filling device, such as a filling device defining one filling passage for providing the interpane gas and one sealing passage for providing a sealant structure or sealant material.

Turning now to the drawings, FIG. 1 is a front schematic representation of a system 210 for assembling an IGU and then filling the IGU with an interpane gas. As shown in FIG. 1, the system includes filling and sealing devices in an engaged position, according to various embodiments. The system 210 includes a vacuum enclosure 212 that is configured to enclose one or more IGUs 100. In the depicted example the enclosure 212 encloses two IGUs 100. The system 210 includes a support structure 222 to support the IGUs 100 within the enclosure 212. In the example shown in FIG. 1, the support structure 222 includes a first conveyor belt 211 and a second conveyor belt 215.

FIG. 1 shows a point in the manufacturing process in which the IGUs 100 are unsealed IGU assemblies positioned within the enclosure. According to various embodiments, components of the IGU assemblies can enter the enclosure in a variety of ways including, for example, positioning by hand. In some cases the loading of components into the vacuum enclosure 212 can include conveying sheets of glass material and IGU subassemblies into the chamber 212 in a linear manner along a linear conveyor system. As shown in FIG. 1, the conveyor system includes the first conveyor belt 211 and the second conveyor belt 215.

In some cases, the conveyor system further includes a pre-chamber support structure and/or a post-chamber support structure. According to various embodiments, components for assembling into an IGU (unsealed or sealed) are transported into the vacuum chamber 212 from a staging position on the pre-chamber support structure using a pre-enclosure conveyor. Conveyors 211, 215 within the enclosure 212 move the components to desired locations within the enclosure 212. In some cases, a conveyor that is part of a post-vacuum chamber support structure and staging area receives the assembled, filled, and sealed IGUs from the interior support conveyors and moves the assembled IGUs away from the vacuum enclosure for further manufacturing as needed.

According to various embodiments, the system 210 includes an assembly plate system (not shown in FIG. 1) that is used to assemble components into an unsealed IGU assembly. In some embodiments, a first sheet of glass material is supported by support structure within the vacuum enclosure 212, such as conveyors 211, 215. The assembly plate system includes an assembly plate and an actuating system that are configured to move the first sheet away from the support structure while remaining within the vacuum enclosure 212. The support structure 211, 215 is configured to support an IGU subassembly after the first sheet is moved away by the assembly plate. The assembly plate is further configured to position the first sheet next to the IGU subassembly as part of forming an unsealed IGU assembly. In some cases the assembly plate includes and/or acts as a vacuum platen that holds the first sheet of glass material with a low pressure or vacuum force during movement away and toward the support structure. The '11 application provides a detailed discussion of various embodiments and possible implementations for an assembly plate system.

Once the IGUs are assembled, the IGUs 100 can be evacuated and filled with one or more interpane gases within the enclosure 212. An unsealed IGU assembly (also referred to as unsealed IGU) defines an IGU passage for fluid communication between an interpane space 108 and an environment external to the IGU. Examples of environments external to the IGU, include the environment immediately surrounding the IGU, an interior of a vacuum enclosure, or a first gas supply tank.

There are several options for defining the one or more fluid communication passages to the interpane space 108 in an unsealed IGU assembly. According to various embodiments of an unsealed IGU assembly, an IGU passage to the interpane space is defined through an opening or hole in the spacer frame, where the sheets are both sealed to the spacer frame along a perimeter of the spacer frame. In some cases the IGU passage can be an opening or hole in the first or second sheet.

Other examples can in some cases include a partially assembled IGU that is unsealed along at least a portion of the spacer frame and at least one of the sheets, but sealed along the remaining portion of the spacer frame. An IGU passage to the interpane space of the partially assembled IGU is defined at the unsealed edge portion in these examples. In yet another example, the unsealed IGU assembly is a wedge-sealed IGU where a filling block is positioned between the glass sheets outside of a perimeter of the spacer frame.

As shown in FIG. 1, both the enclosure 212 and the unsealed IGUs 100 can be filled with ambient air from the atmosphere in which the system 210 is located, such as a manufacturing facility. The enclosure 212 can then be sealed, such as to prevent the unintended flow of gases from outside the enclosure 212 to the inside, or from inside the enclosure 212 to outside. The system 210 further includes a vacuum source configured to evacuate a large part of the existing gas or air from the interior of the enclosure 212. The vacuum source can further evacuate the existing gas from the interpane space 108 of the unsealed IGUs 100, because the unsealed IGUs are within the enclosure.

In the implementation shown in FIG. 1, the enclosure includes a vacuum source that includes openings 213. The number of vacuum openings 213 can vary depending on the size and volume of the enclosure needing evacuation. The vacuum openings 213 shown in FIG. 1 are positioned in a back plate 230 of the enclosure 212, near the top of the enclosure 212. The relative location of the vacuum openings 213 can be selected so that the vacuum openings 213 are located away from IGUs positioned in the enclosure 212. As an example, the vacuum openings 213 may not be located directly adjacent to (e.g., in front of or behind) the flat sheet surfaces of the IGUs. This arrangement can avoid pulling a vacuum directly on the sheets of the IGU.

Although not pictured, the vacuum source can also include a vacuum generator (e.g., a vacuum pump) that is in fluid communication with the openings 213. Ducting and/or other means of fluid communication connects and provides selective fluid communication between the vacuum generator and the vacuum openings 213 in the vacuum enclosure 212.

Returning to FIG. 1, according to various embodiments, the system 210 includes a source or supply 214 of a first gas. In some cases the gas source includes a portion of a conveyor belt or other support structure which the unsealed IGU rests upon, such as through holes in a conveyor belt positioned below a bottom gap formed by an unsealed IGU assembly. In some cases, the gas supply includes a probe. As shown in FIG. 1, in some cases the source can include a filling and sealing device 214.

The supply or source 214 of a first gas (e.g., including the filling and sealing device 214 shown in FIG. 1) is configured to introduce the first gas into the interpane space through an IGU passage. In various embodiments, the source/device 214 is configured to be positioned adjacent to the IGU passage, such that as gas is released from the source 214, the gas travels through the IGU passage and into the interpane space 108. In some cases the system 210 may also include a supply or source 216 of a second gas for filling the vacuum enclosure 212. In some cases the source 216 includes one or more openings in the back plate 230 of the enclosure 212. The supply 216 can include one, two, or more openings in the enclosure back plate 230. The supply 216 of a second gas can be configured to introduce the second gas into the enclosure 212. In various embodiments, the second gas is introduced to the volume within the enclosure 212 at a location that is external to the interpane space 108 and is not adjacent to the IGU passage.

The system 210 can further include a sealing device configured to seal the one or more unsealed IGUs after the first gas has been introduced into the interpane space 108. The sealing device can seal the one or more unsealed IGUs by closing or sealing the one or more IGU passages. As noted above, according to various embodiments, the source device 214 can be a combined filling and sealing device 214.

According to various embodiments, one type of a first sealing device includes a press plate that is optionally part of an assembly plate. In this configuration, an adhesive can be applied to a spacer frame making up part of the IGU subassembly. The assembly and/or press plate presses the first sheet of glass material against the spacer frame to seal the first sheet against the spacer frame. According to various embodiments, the press plate seals the first sheet and IGU subassembly together but the IGU passage is sealed in another manner. As an example, a press plate can seal a first sheet of glass material and an IGU subassembly together while a separate sealing device (including, for example, the filling and sealing device 214 depicted in FIG. 1) seals an IGU passage, such as a hole in the spacer frame, with a sealant, a rivet, or another suitable sealing mechanism or material.

Figure 2:
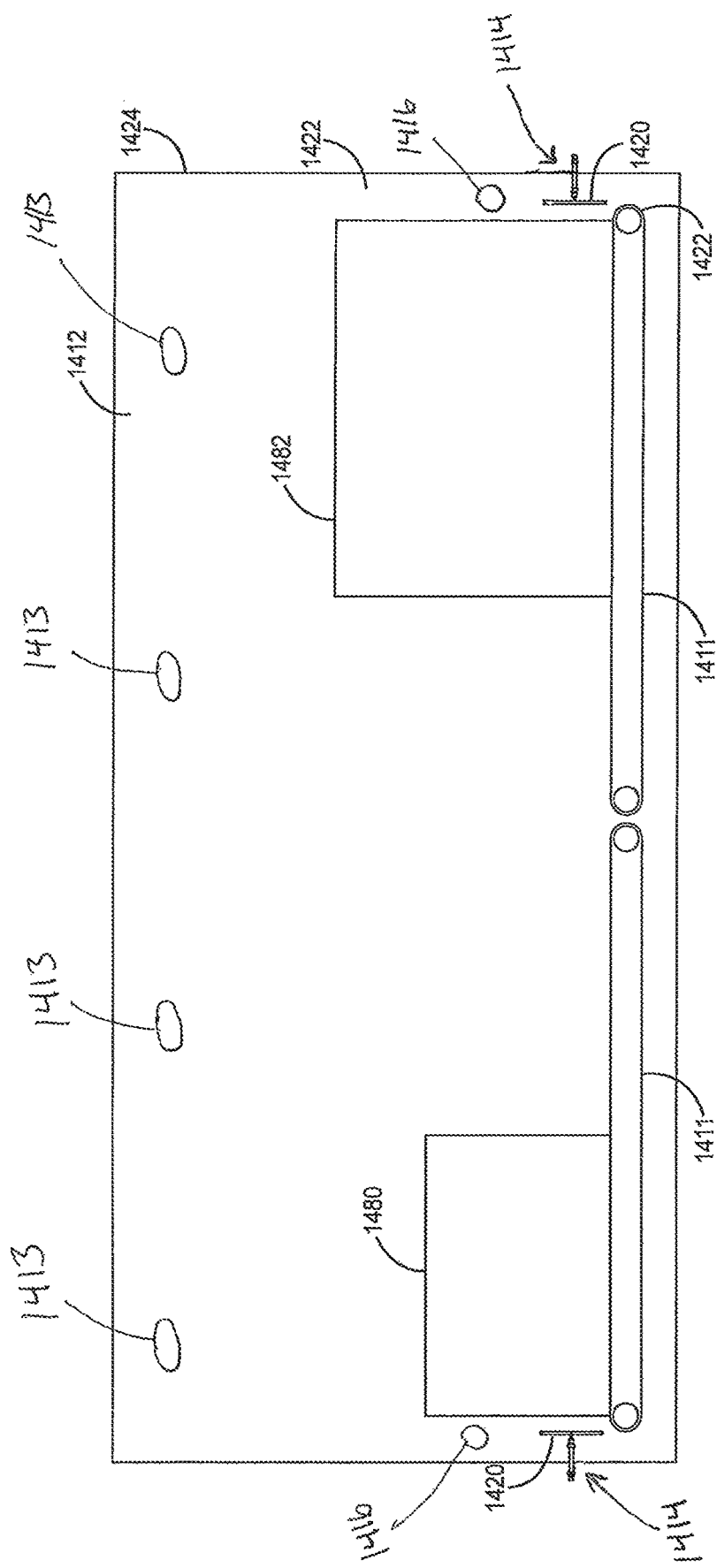
FIG. 2 is a front schematic representation of a system for assembling and filling two IGUs of different sizes with an interpane gas, with filling and sealing devices in a disengaged position, according to various embodiments.

FIG. 2 is a front schematic representation of a system 1400 for assembling and filling two IGUs 1480, 1482 of different sizes with an interpane gas within an enclosure 1412. As shown in FIG. 2, the system 1400 includes filling and sealing devices 1414 that in this illustration are in a disengaged position according to various embodiments. According to various embodiments, in some cases a filling and sealing device can include one or more filling heads 1420 as shown in FIG. 2 and will be discussed further herein.

According to some embodiments, a manufacturing process or method can include loading one or more partially assembled IGUs 1480, 1482 into an open evacuation enclosure 1412, which can also be referred to as an open evacuation chamber, an evacuating chamber 1412, or for simplicity, a chamber 1412. In various embodiments, the loading of partially assembled IGUs can include loading multiple partially assembled IGUs into the chamber 1412. In some embodiments, the multiple IGUs can include IGUs of various size as shown in FIG. 2. In some embodiments, the multiple IGUs can include IGUs of the same size. The partially assembled IGUs 1480, 1482 can include a first and second sheet of a glass material and a spacer structure formed into a frame between the first and second sheets.

In various embodiments, the chamber 1412 can include a support structure 1422. The support structure 1422 can support the IGUs 1480, 1482 while the IGUs 1480, 1482 are located within the chamber 1412, such as to support the IGUs 1480, 1482 in the desired position and/or configuration. In some embodiments, the support structure 1422 can include a conveyor belt 1411.

The loading of multiple partially assembled IGUs can include conveying the multiple partially assembled IGUs into the chamber 1412 in a linear manner. In an embodiment, the multiple partially assembled IGUs are conveyed into the chamber 1412 using a conveyor belt 1411. As discussed above, in some embodiments multiple partially assembled IGUs can be transported into a vacuum chamber from a staging position on a pre-chamber support structure 5930. In an embodiment, a pre-chamber or pre-enclosure conveyor automatically moves partially assembled IGUs from the exterior of the chamber 5904 onto a support structure 5942 within an interior 5906 of the vacuum enclosure. According to some implementations, the support structure 5942 can be one or more conveyors, such as the conveyors 1411 located within the enclosure 1412, as shown in FIG. 2. The conveyors 1411 can then move the partially assembled IGUs to a final position within the chamber 1412. In some embodiments, various conveyors are used to automatically move the partially assembled IGUs into the chamber. In an embodiment, a pre-chamber conveyor moves the IGUs in a linear or translating movement into the chamber. In an embodiment, a post-chamber conveyor moves the IGUs in a linear or translating movement away from the chamber.

The partially assembled IGUs 1480, 1482 can define an open passage between a portion of the spacer frame and one of the sheets. The partially assembled IGUs 1480, 1482 can have a tent-like configuration, such that the sheet is angled away from or separated from the spacer along an edge, such as to provide a wider base that defines the open passage. According to various embodiments, an assembly plate system and/or a press plate can close the partially assembled IGUs 1480, 1482, while leaving an open IGU passage (for example, a hole or opening in a spacer or sheet) for evacuating and/or filling, and sealing. According to various embodiments, the IGUs 1480, 1482 may enter the enclosure 1412 already assembled, but unsealed due to an open IGU passage.

The manufacturing process or method can include moving (e.g., positioning, transporting, and/or translating) the partially assembled IGU to a calculated position. The calculated position can ensure the open passage mates with a position of a filling and sealing device 1414 that is part of a supply or source of an interpane gas and a supply or source of a sealant. The filling and sealing device 1414 can be external, such that the device 1414 can be located at least partially outside of the chamber 1412. In some embodiments, the external device 1414 can be located within the chamber 1412 and be in fluid communication with a source external to the chamber 1412. In some embodiments the filling and sealing device 1414 can include one or more probes, blocks, or heads for filling and/or sealing. The filling and sealing device 1414 can also include one or more actuators (e.g., linear actuators) to move the device into position, and to retract the device at the appropriate time. For example, a linear actuator may remove a filling head from an IGU passage at the appropriate time.

The manufacturing process or method can include closing the chamber 1412 and evacuating the chamber to substantially remove all of the atmosphere from the chamber 1412 and the partially assembled IGU 1480, 1482. The chamber 1412 can be evacuated through a vacuum source 1413, such as through one or more openings in the back plate of the enclosure, such as discussed above. According to various embodiments, the interpane space of the IGUs may be evacuated using the vacuum chamber. According to various embodiments, the IGUs may be evacuated using the filling and sealing devices 1414, through an open IGU passage.

FIGS. 3-8 are views showing steps in assembling an insulating glass unit assembly using a system 4600 including a vacuum enclosure 1808. According to various embodiments, a filling and sealing device is used to fill an IGU with an interpane gas and then seal the IGU passage while the IGU is within the enclosure 1808. FIGS. 3-8 also depict an implementation according to various embodiments in which an unsealed IGU defines an IGU passage through a hole in a spacer frame.

Figure 8:
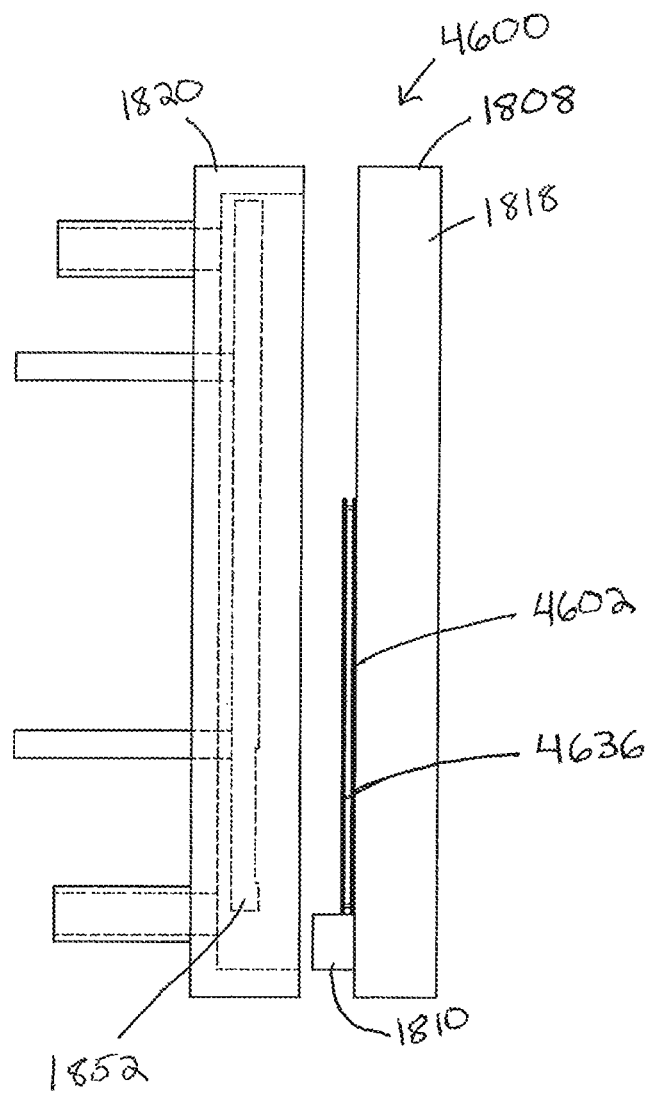

At an early stage of a filling process, an open, empty vacuum enclosure 1808 is provided, including a first portion 1818, a second portion 1820 and a support structure 1810. FIG. 8 depicts the open enclosure 1808 at the end of the process when the IGU has been filled and sealed and is ready to eave the enclosure 1808.

At an early stage of the filling process, a vacuum enclosure 1808 that is open and empty can receive an unsealed IGU 4602 in the vacuum enclosure interior and can close around the unsealed IGU to form a sealed interior, as shown in FIGS. 3-4. FIG. 3 is a side view of the system 4600 with a part of the vacuum enclosure second portion 1820 cut away. FIG. 4 is a side perspective close-up view, also with part of the second portion 1820 cut away. The unsealed IGU 4602 is positioned on the support structure 1810 within the closed vacuum enclosure in FIGS. 3-4. In the example of the FIGS, the unsealed IGU 4602 includes a first sheet 4632, a second sheet 4634, and a spacer frame 4635 positioned between the first and second sheets. The unsealed IGU defines an IGU passage to the interpane space of the IGU, through a hole 4636 in the spacer frame 4635, shown in FIG. 3. When the hole 4636 is referred to in the description of the FIGS., it is understood that the term IGU passage can be substituted for hole. The IGU assembly 4602 defines an open channel 4638 formed between the first and second sheets and next to spacer frame 4635.

There are several different ways of providing the unsealed IGU 4602 on the support structure within the vacuum enclosure 1808 as shown in FIGS. 3 and 4. The hole 4636 can be created in a spacer structure before or after it is formed into a spacer frame. The hole could be created before or after the spacer frame is attached to the first sheet. The hole could be created before or after the first and second sheets are sealed to the spacer frame. For each of these different points in the process of forming the unsealed IGU assembly, the hole could be created within the vacuum enclosure, before the unsealed IGU assembly enters the vacuum enclosure, before or after the vacuum enclosure is closed, and before or after the vacuum enclosure is evacuated. The hole 4636 could be created with a drill, saw, knife, press or other implement.

In some examples, the hole 4636 has a diameter of at least about 0.040 inch, at least about 0.060 inch, at most about 0.25 inch, at most about 0.50, ranging from 0.060 to 0.25 inch, or about 0.125 inch.

In one example, a partially assembled, tented IGU is translated into the vacuum chamber, with the spacer frame attached to the first sheet and to a portion of the second sheet, and with a hole already provided in the spacer frame. The vacuum enclosure is closed around the partially assembled IGU. The vacuum enclosure is then evacuated. Because the partially assembled IGU defines an open bottom portion between the first and second sheets, the air in the interpane space is also evacuated. Then the press plate 1852 is actuated to press the second sheet against the spacer frame to form an unsealed IGU as shown in FIGS. 3-4.

In another example, the interpane space is evacuated through the hole in the spacer frame 4635 after the second sheet is sealed to the spacer frame. In one embodiment, to reduce the risk of the IGU exploding due to a pressure differential with the vacuum enclosure, the vacuum enclosure and the interpane space are be evacuated substantially simultaneously, so that the pressures in each are within 1 pound per square inch.

In the embodiments illustrated in FIGS. 3-8, while the unsealed IGU is within the vacuum chamber, the interpane space is filled with a first gas, while a gas is also introduced substantially simultaneously into the vacuum enclosure's interior. According to various embodiments, a first gas is introduced to the interpane space while a second gas is introduced to the vacuum chamber. In some cases, the same gas is introduced into both spaces.

Figure 6:
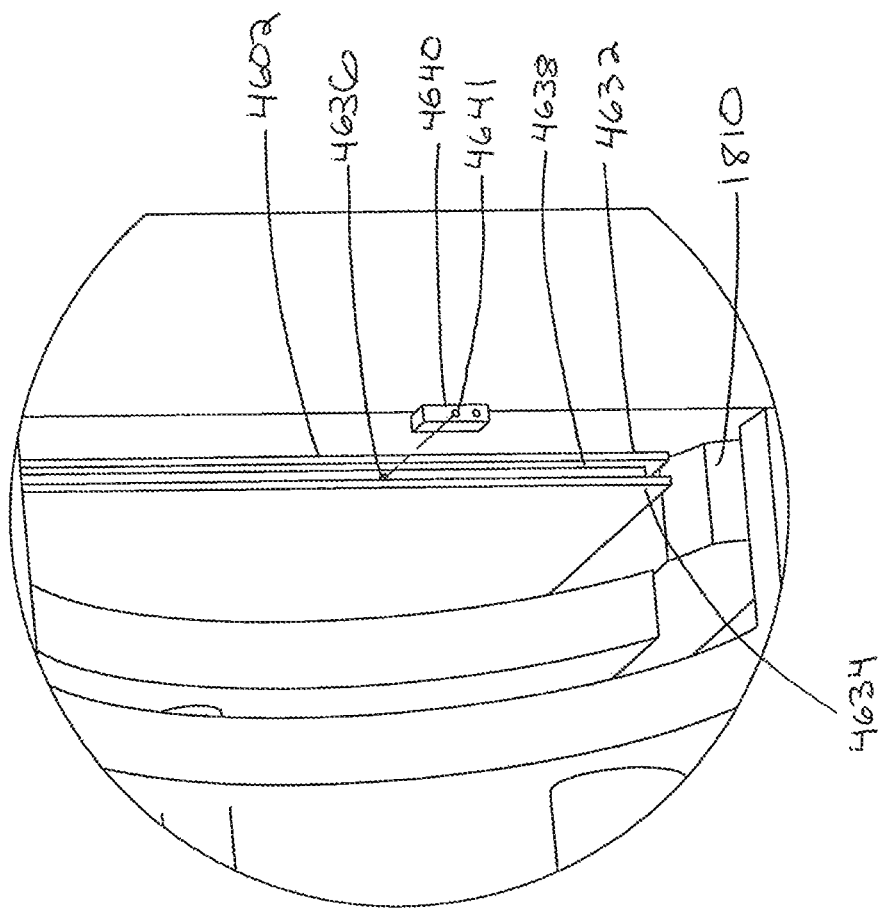
Figure 5:
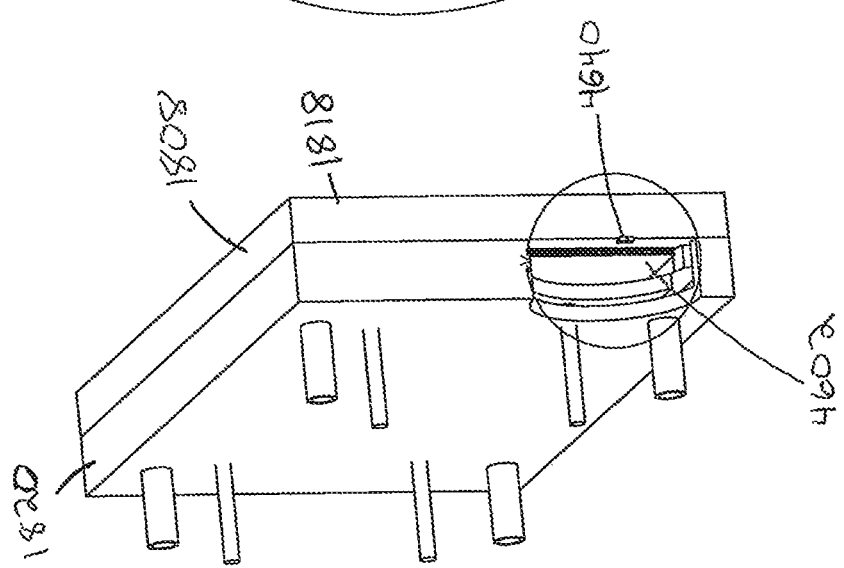
Figure 7:
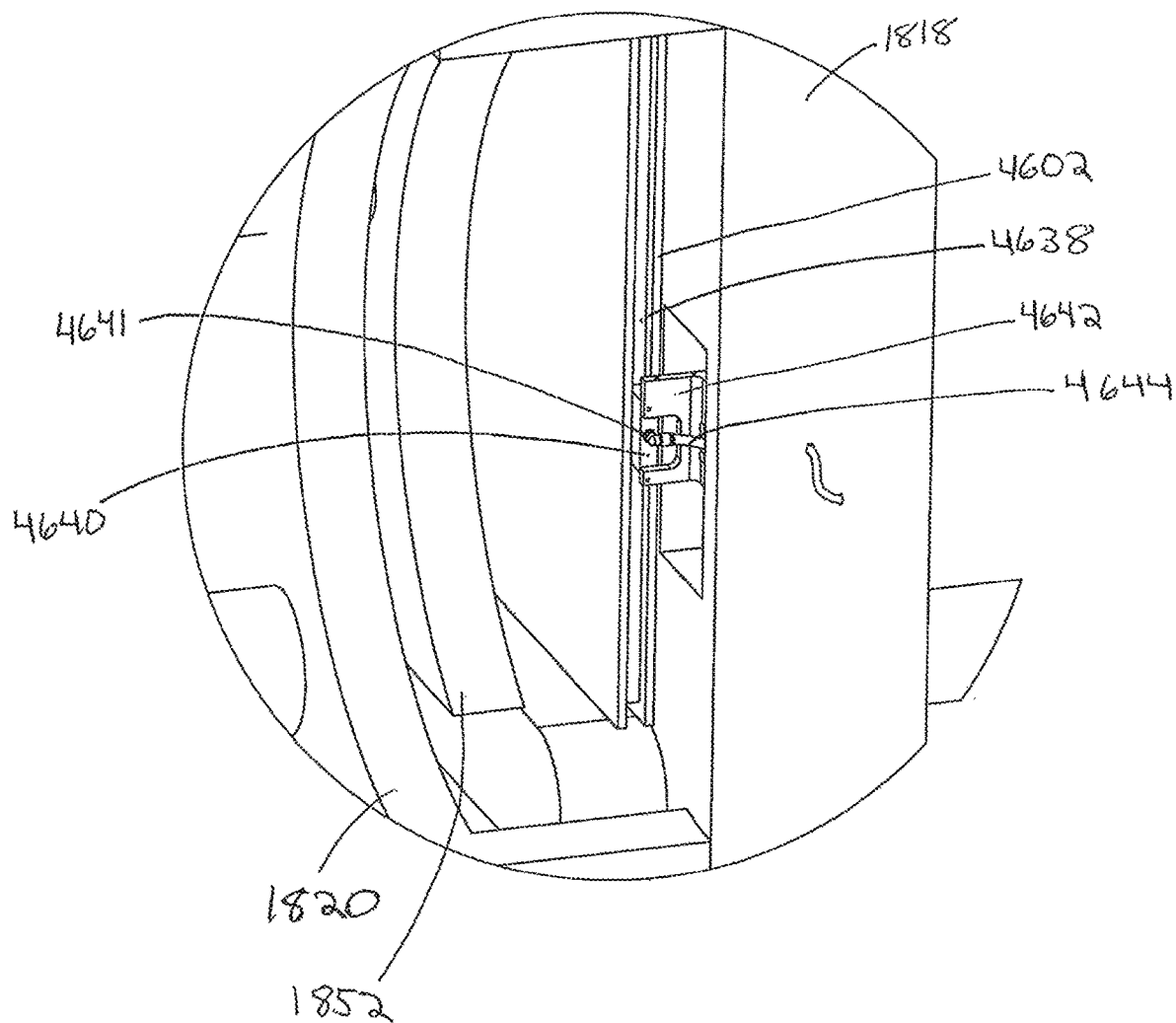

FIGS. 5-7 illustrate a filling and sealing device that is used to provide a gas to the interpane space. According to various embodiments, the device is also used to seal the hole 4636 forming the IGU passage in this example. FIG. 5 is a side perspective view of an IGU 4602 within a vacuum chamber 1808, and FIG. 6 is a close-up view of a portion of FIG. 5. FIGS. 5-6 illustrate a filling and sealing device 4640 defining a filling passage 4641 that can be positioned in the open channel 4638 so that the filling passage 4641 mates with the IGU passage 4636. In some examples, the filling device is substantially block-shaped. In some examples, the filling device is cylindrical in shape. In some embodiments, the filling device includes a planar sealing surface that defines an outlet of the filling passage, so that the planar sealing surface will contact the spacer frame surface when the filling device is in a first position to provide gas to the interpane space. In some examples, the filling device includes a nozzle structure or conical structure that presses up to or into the hole 4636.

FIG. 7 shows a side perspective close-up view of the IGU within the vacuum chamber, and the filling and sealing device 4640 is positioned within the open channel, so that the filling passage is in fluid communication with the IGU passage. The filling/sealing device 4640 is held by an actuator 4642 and is shown being attached to a gas supply conduit 4644. The gas supply conduit 4644 is in fluid communication with a gas tank or other supply system of a first gas for filling the interpane space. In some embodiments, the actuator is attached to the first, fixed portion of the vacuum enclosure. In another embodiment, the filling and sealing device and actuator are attached to a second, moveable portion of the vacuum enclosure.

After the interpane space is filled with the first gas, the hole 4636 is sealed. Although not shown in FIG. 7, according to various embodiments the filling and sealing device 4640 is also connected with a source of sealing material for sealing the IGU passage after filling the interpane space with gas.

The step of sealing the hole in the spacer frame can happen in a number of different ways, times and locations in different examples. In various embodiments, the hole is sealed within the vacuum chamber while the vacuum chamber is still closed. In various embodiments, the vacuum chamber is opened, and the hole 4636 is sealed while the IGU is still present in the open vacuum enclosure. In various embodiments, the vacuum chamber is opened, the IGU is moved out of the vacuum enclosure, and the IGU is moved to a sealing station where the sealing happens.

FIG. 8 is a side view of an open vacuum enclosure 1808, with the IGU 4602 present on the support structure 1810. The hole 4636 and IGU 4602 can be sealed or may not be sealed at the time that the vacuum enclosure is open and the IGU is present in the open vacuum enclosure interior. The reference number 4602 will be used to label the IGU where it is an unsealed IGU or could be a sealed IGU.

In FIGS. 3-8 and in other FIGS. and descriptions herein, methods and systems of filling and sealing are illustrated that use a hole in the spacer to create the IGU passage. The method steps and system of FIGS. 3-8 and those of other examples discussed herein can also be adapted to use a hole in one of the sheets to fill and seal the IGU. In some hole-in-glass filling system examples, the hole is defined in the second sheet, the filling and sealing device is attached to the second portion of the vacuum enclosure and is brought into contact with the hole. The IGU passage, including the hole in the glass, is in fluid communication with the filling/sealing passage of the filling and sealing device when the device contacts the glass. The second portion of the vacuum enclosure, which is a moveable portion of the vacuum enclosure, includes a press plate which has a cut-out area to accommodate the filling device, so that the press plate can move without contacting the filling device. In one example, the press plate includes foam around the filling and sealing device.

In some examples, a method can include a step of selecting a particular filling and sealing device from a plurality of available devices and a system can include a device for selecting a particular filling/sealing device. The plurality of available devices can be different in size, such as to fit different sizes of IGUs, for example, different widths of IGUs. The plurality of available filling devices can be different in type, such as filling devices to form a wedge passage in an unsealed double pane IGU or triple pane IGU. In some examples, the plurality of available filling and sealing devices are provided and are picked up automatically as appropriate for a particular IGU. In some examples, the plurality of available filling devices are provided on a carousel and are automatically rotated into position as appropriate for a particular IGU. In some examples, the plurality of available filling devices are provided outside of the vacuum enclosure, and the particular filling device is selected when the vacuum enclosure is open.

In some examples, a method can include adjusting a dimension of a filling/sealing device and a system can include a filling/sealing device having an adjustable dimension. In some examples, the dimension of the filling device is adjusted by an adjustment device including one of a group consisting of a shim, a plurality of shims, and a screw.

Figures 9, 10:
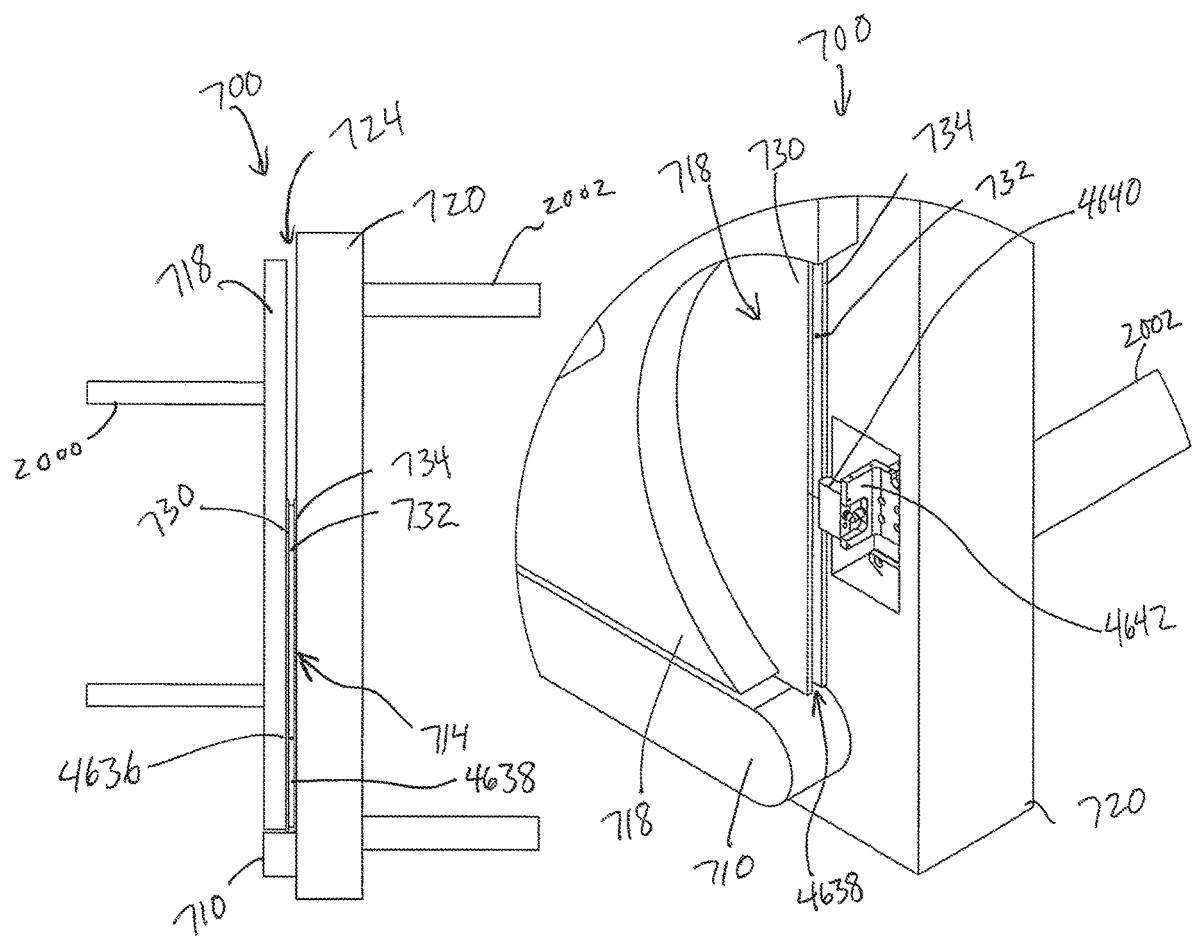
FIGS. 9-12 are views showing steps in assembling an insulating glass unit assembly without an enclosure and using a filling and sealing device, according to various embodiments.

FIG. 9 is a side view of a filling system 700 that shows an assembled, unsealed IGU assembly 714 on a support structure 710 within an interior 724 of a filling stage 708. According to various embodiments, the filling stage 708 is formed by first and second plates 718, 720, according to various embodiments. In some cases the first plate 718 can also be referred to as an assembly plate.

The unsealed IGU assembly 714 defines an IGU passage to the interpane space of the IGU through a hole 4636 in the spacer frame 732, shown in FIG. 9. When the hole 4636 is referred to in the description of the FIGS., it is understood that the term IGU passage can be substituted for the term hole. According to the illustrated example, the unsealed IGU assembly 714 defines an open channel 4638 formed between the first and second sheets 730, 734 and next to spacer frame 732.

There are several different ways of providing the IGU passage for the unsealed IGU assembly 714 on the support structure 710 as shown in FIG. 9. The hole 4636 can be created in a spacer structure before or after it is formed into a spacer frame. The hole could be created before or after the spacer frame is attached to the first sheet. The hole could be created before or after the first and second sheets are sealed to the spacer frame. For each of these different points in the process of forming the unsealed IGU assembly, the hole could be created within the filling stage, before the IGU subassembly enters the filling stage, and before or after the unsealed IGU assembly is formed. The hole 4636 could be created with a drill, saw, knife, press or other implement.

In some examples, the hole 4636 has a diameter of at least about 0.040 inch, at least about 0.060 inch, at most about 0.25 inch, at most about 0.50, ranging from 0.060 to 0.25 inch, or about 0.125 inch.

According to various embodiments, the plates or platens 718, 720 of a no-chamber gas filling stage are configured, according to various embodiments, to press together in order to secure an unsealed IGU assembly for evacuating the interpane space of the IGU assembly without the need for an enclosing vacuum chamber. According to some implementations, the plates are also configured to pull a vacuum on each of the outer sheets of the IGU assembly while pressing together. One example of this type of evacuation configuration involves using the first plate to press an IGU component against a second plate, thus stabilizing and securing the IGU component. According to various embodiments, the first plate and/or the second plate are configured to pull a vacuum on an outer sheet of a supported IGU assembly to further secure and stabilize the IGU assembly during evacuation and filling without the use of a vacuum chamber.

Turning back to FIG. 9, in some implementations the first and second plates 718, 720 are configured as vacuum platens. For example, the first plate 718 can include a fluid connection 2000 that provides selective fluid communication between vacuum openings on the face of the first plate and a vacuum source. Similarly, in some cases the second plate 720 includes a fluid connection 2002 that provides selective fluid communication between vacuum openings on the face of the second plate and a vacuum source.

Before evacuation of the interpane space, the unsealed IGU assembly 714 is pressed by the first plate or assembly plate 718 assembly plate against the second plate 720. The pressing action may be part of the process of forming the unsealed IGU assembly. According to some embodiments, evacuating the IGU assembly in an ambient atmospheric environment can cause the spacer 732 to slip out of place, thus increasing the likelihood that one or more glass sheets will shatter. In some cases the force from pressing the IGU assembly against the second plate 720 holds the spacer 732 in position between the first and second sheets 730, 734.

According to some implementations, while pressing the unsealed IGU assembly 714 against the second plate 720, the gas filling system 700 creates a first vacuum next to the first sheet 730 and creates a second vacuum next to the second sheet 734. In some cases, creating the first vacuum next to the first sheet 730 is accomplished by evacuating air through openings in the face of the assembly or first plate 718. Creating the second vacuum next to the second sheet 734 can be accomplished in a similar manner by evacuating air through openings in the second plate 720 as discussed elsewhere herein.

Figures 11, 12:
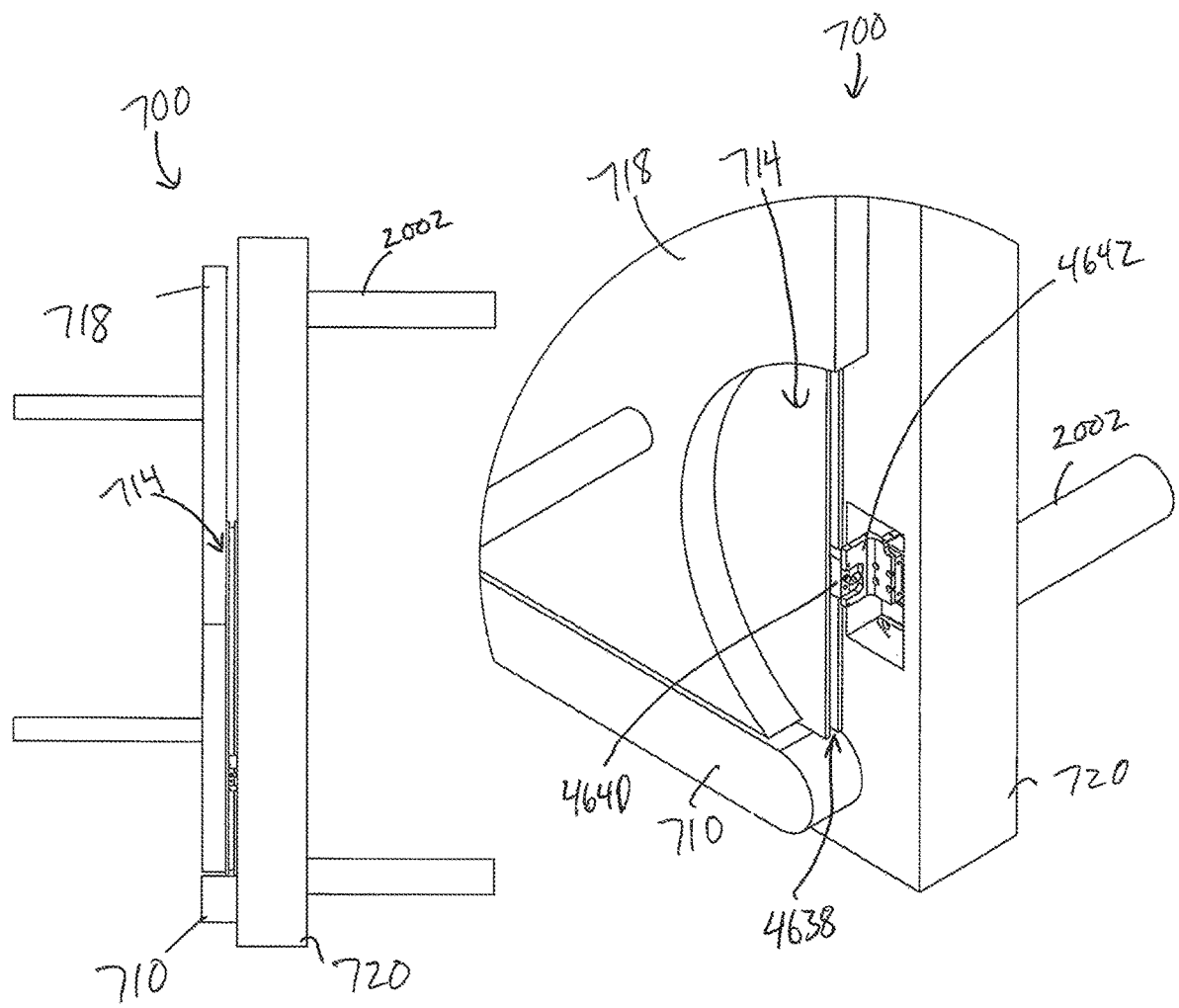
Figure 18:
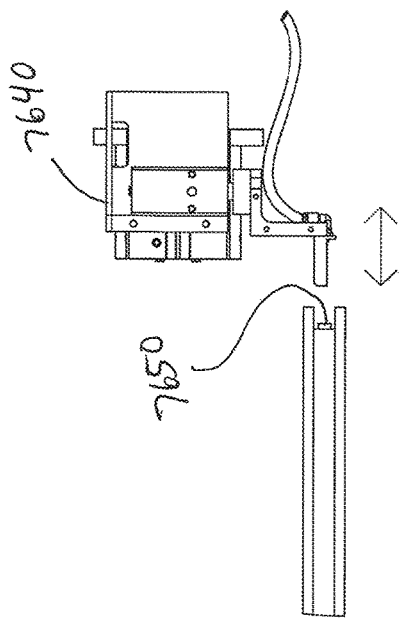
FIGS. 17-20 show assembly steps for a filling device similar to FIGS. 13-16, but showing a rivet being provided by the filling device to seal the IGU passage.
Figure 17:
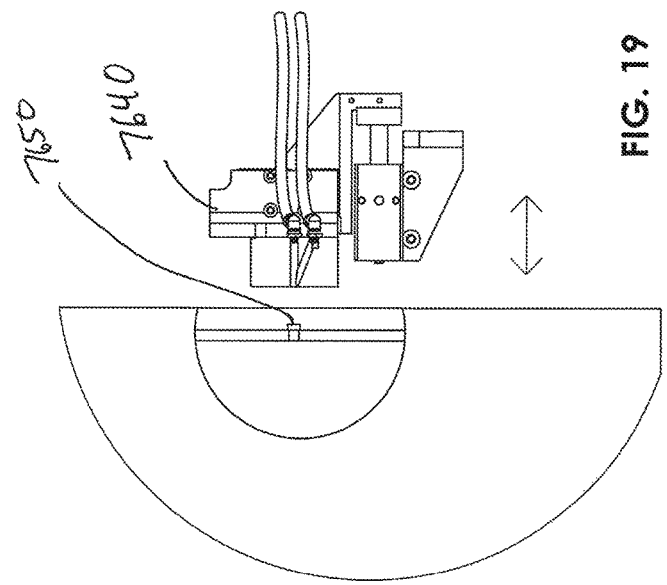
Figure 20:
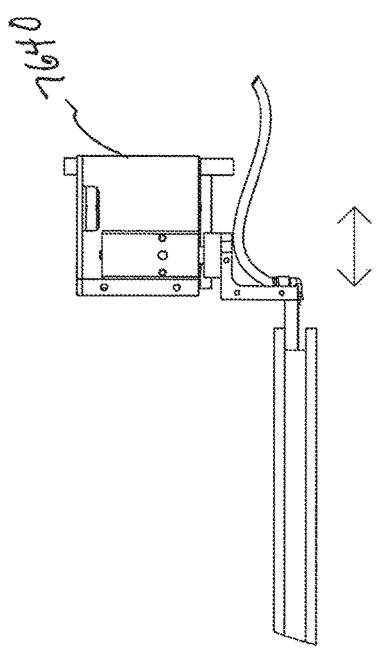
Figure 19:
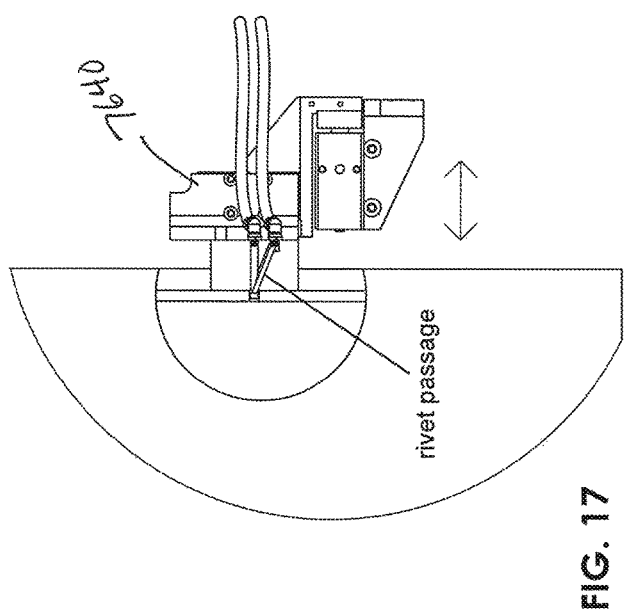

In contrast to evacuating and filling with a vacuum chamber, various embodiments provide a filling and sealing device, which is also referred to herein as a fluid handling device. The filling and sealing (fluid) device can be used to evacuate and/or fill the interpane space of an unsealed IGU assembly. In some cases a fluid handling device can be used to evacuate and fill an IGU assembly in an ambient environment having an air pressure approximately equal to atmospheric pressure. FIGS. 10-12 illustrate a fluid handling device that can be used to evacuate and fill the interpane space of an unsealed IGU assembly according to various embodiments.

In some cases, a fluid handling device can define one, two, or more passages extending through the device for communicating with the IGU passage and/or interpane space of an unsealed IGU assembly. In some implementations one or more passages can be provided for evacuating air from the interpane space and pumping one or more gases into the interpane space of an unsealed IGU assembly. In some implementations, a passage may be provided for inserting a sealant into the IGU passage in order to close the IGU passage and seal the IGU. In some implementations a passage may be provided for inserting a sealant structure, such as a rivet, into an IGU passage such as a hole in the spacer.

According to various embodiments, a single passage can be used for communicating one, two, three, or more substances to and/or from the interpane space through the IGU passage. As an example, in some cases a fluid handling device may have a single passage that is used to evacuate an interpane space and also fill the interpane space with a gas. In such cases, the passage can be alternately coupled with correspondingly different sources, such as a vacuum generator and a gas source.

In some embodiments, a fluid handling device may have multiple passages that extend separately through the device. In some cases a device may have multiple passages that enter the device separately, but then converge into a single outlet for communication with the IGU passage. A variety of other configurations for the fluid handling device are possible in various embodiments, including the use of multiple device heads that optionally track together when the device is moved. According to some embodiments, the fluid handling device only includes one fluid passage that is used to evacuate air from the IGU assembly and also to fill the IGU assembly with an interpane gas.

Turning back to the figures, FIG. 10 is a cut away perspective view of a system showing an actuator 4642 and a connected fluid handling device 4640 positioned next to the IGU passage 4636 of the unsealed IGU assembly 714 depicted in FIG. 9. FIGS. 13-14 are partial front and top schematic views of a system similar to that in FIG. 10 showing the actuator 4642 and the connected fluid handling device 4640, according to various embodiments. FIGS. 13-14 show the fluid handling device 4640, actuator 4642, IGU 714, and a side part of a first plate 718 of the gas filling system 700, with the fluid handling device positioned away from engagement with the IGU passage or hole in spacer frame.

FIGS. 11-12 are side schematic and cut away perspective views, respectively, of the system 700 of FIG. 10 showing the connected fluid handling device 4640 inserted into the IGU passage 4636 of the unsealed IGU assembly 714, according to various embodiments. FIGS. 15-16 are partial front and top schematic views of the system of FIG. 11-12 showing the actuator 4642 and the connected fluid handling device 4640, according to various embodiments. FIGS. 15-16 show the same components as those shown in FIGS. 13-14, but with the fluid handling device contacting the spacer frame, so that the outlet of the fluid passages is in fluid communication with the hole in the spacer frame. The arrows indicate that the fluid handling device can be moved by the actuator toward or away from the IGU to bring the fluid handling device close to the hole in the spacer frame.

In the illustrated implementation, the fluid handling device 4640 defines a first fluid passage 4641 and a second fluid passage 4643 that exit from the device 4640 at a single outlet. The outlet can be positioned in the open channel 4638 of the IGU assembly 714 so that the fluid passages 4641, 4643 mate with the IGU passage 4636 through the single outlet in the fluid handling device 4640.

According to various embodiments, one of the fluid passages 4641 can be used to fill the interpane space, and thus the passage 4641 is connected to a gas supply line 4645. In some cases, another passage 4643 is separately provided for sealing the IGU passage 4643 and is correspondingly connected to a sealant supply conduit 4644. The sealant supply conduit 4644 is in fluid communication with a supply of sealant for filling the interpane space.

The fluid handling device 4640 is positioned within the open channel 4638 of the IGU assembly, so that the fluid passage is in fluid communication with the IGU passage. The fluid handling device 4640 is held by an actuator 4642 and is attached to the fixed, second plate 720 as shown in the figures. In some cases, the fluid handling device and actuator may alternatively be attached to the first, moveable plate 718 of the filling system 700.

In some examples, a fluid handling device is substantially block-shaped. In some examples, the fluid handling device is cylindrical in shape. In some embodiments, the fluid handling device includes a planar sealing surface that defines an outlet of the fluid passage, so that the planar sealing surface will contact the spacer frame surface when the fluid handling device is in a first position to fill the interpane space or seal the IGU passage. In some examples, the fluid handling device includes a nozzle structure or conical structure that presses up to or into the hole 4636.

In various embodiments, the actuator 4642 is an automatic actuator. In various implementations, a control system for the actuator includes one or more of a processor, a motor and machine-readable instructions.

According to various embodiments, an IGU passage such as a hole in a spacer frame, can be sealed in a variety of manners. According to some implementations, a hole in the spacer frame is sealed by providing a rivet in the hole. In some cases, a rim of the rivet is provided with a sealant material to seal to the surrounding surface of the spacer frame. In some embodiments, the hole is sealed by providing a sealant material in the IGU passage that blocks fluid communication between the interpane space and the surrounding environment. Examples of sealant materials include polyisobutylene (PIB), butyl, curable PIB, hot melt silicon, acrylic adhesive, acrylic sealant, and other Dual Seal Equivalent (DSE) type materials. Other examples include other materials. In some embodiments, the hole in the spacer frame is sealed by covering the hole with tape or a patch.

In some examples, the filling device defines a sealing conduit that is configured to provide a structure or material to seal the IGU passage, such as sealant material, a patch, a rivet, or a piece of tape. After filling the interpane space, the filling device can automatically move so that the sealing conduit is in fluid communication with the IGU passage, and then provide the sealing structure or material to seal the IGU passage. In another example, the filling device is moved away from the IGU passage after filling the interpane space, and a seal head including a sealing conduit is moved into communication with the IGU passage to provide a sealing structure or material. In one embodiment, the sealing conduit is a rigid conduit for moving a rivet into the IGU passage.

FIGS. 17-20 show assembly steps for a filling device 7640 similar to the filling device 4640 illustrated in FIGS. 13-16, but in the case of FIGS. 17-20, the filling device 7640 is configured to seal an IGU passage with a rivet 7650.

Figure 21:
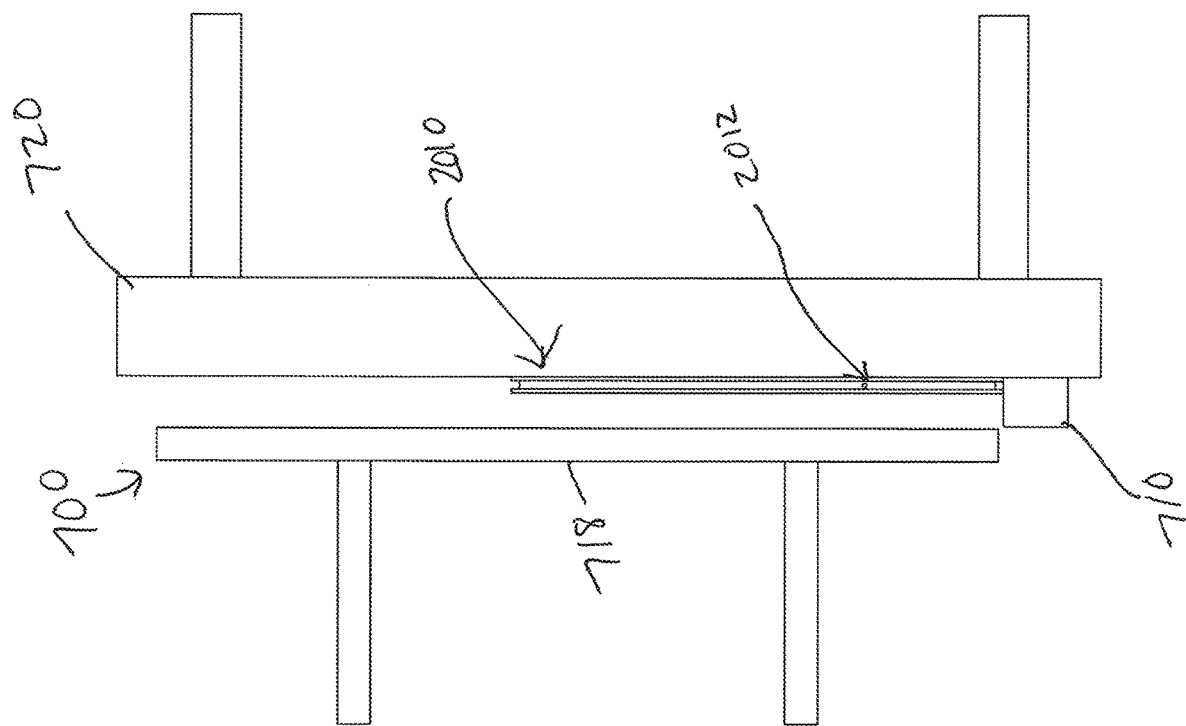
FIG. 21 is a side view of an assembled IGU on a support surface after sealing, with the assembly plate moved away from a first plate, according to various embodiments.

FIG. 21 is a side schematic view of the system 700 discussed previously, showing an assembled IGU 2010 after gas filling and sealing, according to various embodiments. As shown in the figure, the first and second plates 718 and 720 are opened and spaced apart, providing access to the completed, sealed IGU 2010 according to various embodiments.

According to various embodiments, the IGU passage has been closed with a sealant 2012 as previously discussed, thus sealing the IGU's interpane space. In some cases the IGU passage may be closed and sealed while the IGU is still on the support structure.

Figure 22:
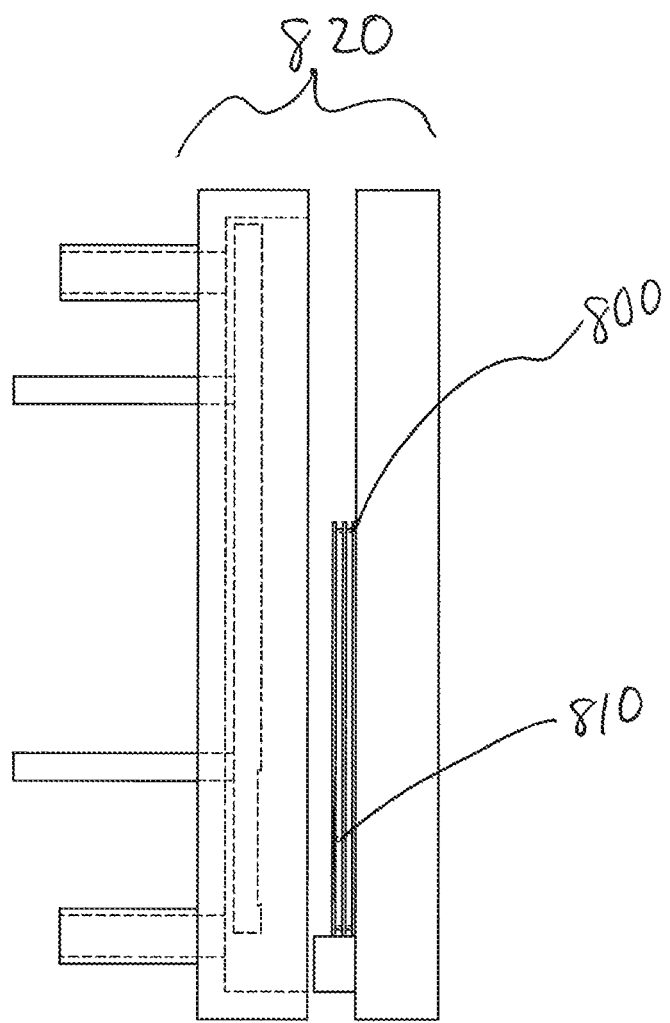
FIGS. 22-24 are schematic views of a triple pane IGU assembly process, according to various embodiments.
Figure 24:
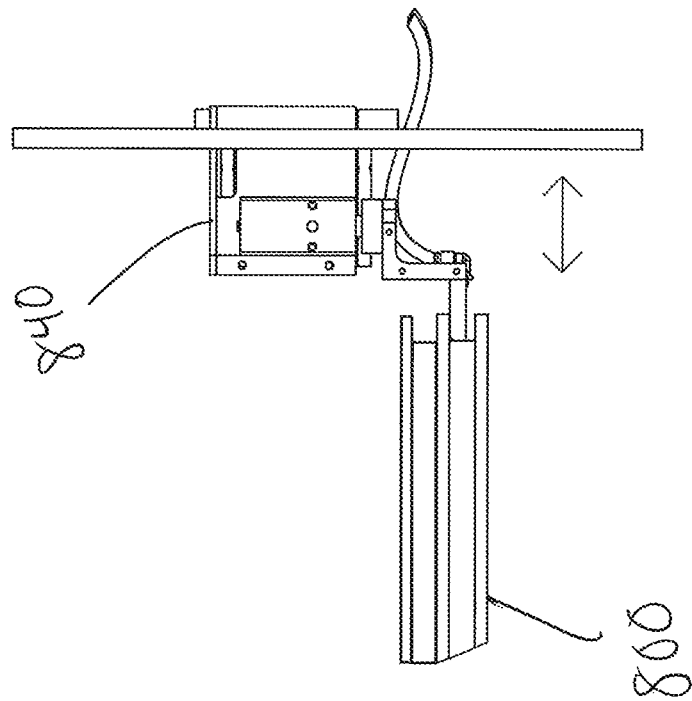
Figure 23:
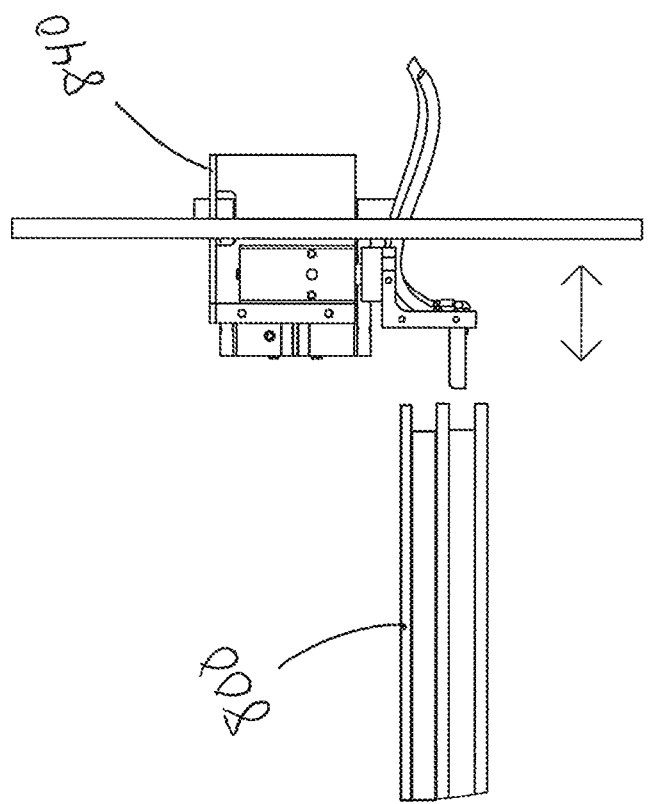

According to various examples already discussed, an unsealed, double pane IGU can be filled with an interpane gas and then sealed using a filling and sealing device according to the teachings herein. Turning to FIGS. 22-24, it is also possible to use these same method steps to gas fill and seal a triple pane IGU 800. FIGS. 22-24 are schematic views of a triple pane IGU assembly process, according to various embodiments. FIG. 22 shows a triple pane IGU assembly 800 situated within a vacuum enclosure 820, ready for filling and sealing. The triple pane IGU includes a first sheet, second sheet, and an intermediate sheet between the first and second sheet, where the intermediate sheet defines an opening to allow fluid communication between the two portions of the interpane space. In some embodiments, a triple pane IGU includes two spacer frames: a first spacer frame between the first sheet and intermediate sheet and a second spacer frame between the second sheet and intermediate sheet. A hole 810 for an IGU passage can be defined in either the first spacer frame or the second spacer frame to allow for filling according to the methods described herein.

In another example, a triple pane IGU includes a single spacer frame spanning a gap between the first and second sheets, where a perimeter of the intermediate sheet is located within the perimeter of the single spacer frame. Examples of such single spacer frames for triple pane IGUs are shown in U.S. Published Applications 2012/0151857 and 2014/0109499, which are hereby incorporated by reference in their entireties. A hole for an IGU passage can be defined through such a single spacer frame structure, such as close to the first sheet, close to the second sheet, to allow for filling according to the methods and systems described herein.

FIG. 23 shows a filling device 840 disengaged from a triple pane IGU assembly 800. FIG. 24 shows a filling device 840 engaged with the IGU passage of the triple pane IGU assembly 800, according to various embodiments.

FIGS. 25-27 are schematic views of a filling device 900 having separate conduits for filling and sealing, according to various embodiments. The filling device 900 has similarities to the fluid handling device 4640 illustrated in FIGS. 12-16. As an example, each of the devices 4640, 900 has two passages, one for delivering a gas to the interpane space and another for delivering a sealant to the IGU passage. In the example shown in FIGS. 12-16, the two passages 4641 and 4643 exit from the device 4640 at a single outlet. Accordingly, once the device 4640 is moved into position and sealed to the IGU passage 4636 to deliver the interpane gas, the device does not need to be moved again to delivery a sealant to the IGU passage.

Turning to FIGS. 25-27, the filling device 900 includes a gas filling passage 945 and a sealing passage 944 that each have a dedicated inlet in the filling device 900, and a dedicated outlet exiting the filling device 900. The filling device 900 is connected to an actuator 942 that is configured to move the filling device 900 relative to the IGU passage depending on whether a gas or a sealant is being delivered. For example, the actuator 942 can be configured to shift the filling device 900 between a disengaged position shown in FIG. 25, where the filling device 900 is not in contact with an unsealed IGU assembly, to either a gas filling position shown in FIG. 26 or a sealing position shown in FIG. 27. Shifting the filling device 900 between the two filling positions selectively aligns the gas outlet or the sealing outlet with the IGU passage 936 in the spacer frame of the unsealed IGU assembly 918.

According to various embodiments, a filling device can include more than one delivery head for delivering multiple substances. Referring to FIGS. 26-27, it can be seen that the filling device 900 in that example includes a single head. Turning to FIG. 28, a filling device 940 in some embodiments includes a gas seal head 950 that is independent from a sealing material seal head 960. An actuator 970 coupled to the seal heads 950, 960 is configured to shift the connected seal heads relative to the IGU assembly in order to selectively align one of the heads with an IGU passage 980 in the IGU assembly.

According to various embodiments, filling and sealing an unsealed IGU assembly as discussed above can incorporate or otherwise take into account the following features and aspects:

According to various embodiments, such as those described herein, an IGU subassembly for mating with a first sheet includes at least a second sheet of glass and a spacer frame sealed to the second sheet of glass. For a double pane IGU, an IGU subassembly includes at least a second sheet of glass and a spacer frame sealed to the second sheet of glass. For a triple pane IGU, an IGU subassembly includes at least a second sheet of glass, an intermediate pane of a transparent or translucent material defining an opening, and at least one a spacer frame sealed to the second sheet of glass and sealed to the intermediate pane. Some triple pane IGUs include a single spacer frame, and some include two spacer frames. The concepts described herein can apply to a double pane IGU assembly, a triple pane IGU assembly with a single spacer frame, and to a triple pane IGU assembly with two spacer frames. Where the term "the spacer frame" is used in this description, it could generally be replaced with "the at least one spacer frame" to apply to the context of a triple pane IGU with two spacer frames.

According to various embodiments described herein, an unsealed IGU assembly, or unsealed IGU, is formed by the combination of a first sheet and an IGU subassembly. Such an unsealed IGU defines an IGU passage that is used for filling the interpane space with a first gas. According to various embodiments, a system includes a filling device that defines a filling passage and is in communication with a source of the first gas. The filling device is configured to move into a first position where the filling passage is in fluid communication with the IGU passage.

Further options for IGU subassemblies and unsealed IGU assemblies are described elsewhere herein, in the CIP application, the'11 application and the'12 application. For the purposes of this provisional application, an unsealed IGU assembly defines the IGU passage in either one of the sheets or in the spacer frame.

According to various embodiments, an unsealed IGU assembly and IGU passage can be formed in a number of different ways. In one example of an unsealed IGU assembly, an IGU passage to the interpane space is defined through an opening or hole in the spacer frame, where the sheets are both sealed to the spacer frame along a perimeter of the spacer frame. In this example, the spacer frame is sealed to both the first sheet and the second sheet around the entire spacer frame perimeter.

In yet another example of an unsealed IGU assembly, an IGU passage is defined through an opening or hole in the first or second sheet. The opening can be located close to an edge and/or corner of one of the first and second sheets. The spacer frame is sealed to both the first sheet and the second sheet around the entire spacer frame perimeter.

Several options for assembly of unsealed IGU assemblies having a hole in spacer or a hole in a sheet are described in the CIP application. In addition, several options for assembly of each of the different types of unsealed IGU assemblies are described in the '11 application and the '12 application. In some examples, the unsealed IGU assembly is provided to the support structure next to the first plate in a formed state without the assembly plate being involved in forming the unsealed IGU assembly.

According to various embodiments, a system is configured to automatically move a filling device into fluid communication with the IGU passage defined by the unsealed IGU assembly. The CIP application describes options for moving a filling device into that position, and those same options apply to the filling device of the systems described herein. The filling device is configured to evacuate the interpane space through the filling passage defined in the filling device.

During evacuation of the interpane space, the unsealed IGU assembly may be in a vacuum enclosure which is being evacuated substantially simultaneously, as described in the CIP application and in the '11 application. In another example, during the evacuation of the interpane space, the first and second sheets can be supported by first and second vacuums provided at their exterior surfaces, while an assembly sheet is pressing the unsealed IGU assembly against first sheet, as described in the '12 application.

Further details regarding evacuation of a space, such as the interpane space or an interior of a vacuum enclosure, are provided in the CIP application, the '11 application and the '12 application.

In some examples, the filling device has the capability to fill the interpane space with a gas through the same passage used to evacuate the interpane space, namely, the IGU passage. Many specific details regarding specific gasses, methods and systems for filling the interpane space with a gas are described in the CIP application and can apply to the systems described herein.

The pressure within the interpane space increases as the gas is introduced into the interpane space. In some examples, the level of the first vacuum on the first sheet and the level of the second vacuum on the second sheet are gradually reduced as the pressure within the interpane space increases. In some examples, the pressure at an exterior surface of the first sheet and an exterior surface of the second sheet is within about 1 PSI or within about 2 PSI the pressure in the interpane space.

In some examples, the method includes delivering a sealing material to the IGU passage with the filling device to seal the interpane space. In some examples, delivering a sealing material to the IGU passage to seal the interpane space happens within the vacuum enclosure.

A plug or other sealing material can be placed over or into the opening in the spacer or sheet to seal the interpane space. According to an embodiment, one or more IGU passages can be filled with a sealant. According to another embodiment, a rivet can be pressed into the IGU passage to seal the interpane space. In other case, a patch or a piece of tape can be placed over the IGU passage inlet.

The system can further include a sealing device configured to seal the one or more unsealed IGUs after the first gas has been introduced into the interpane space. The sealing device can seal the one or more unsealed IGUs by closing or sealing the IGU passage of each IGU within the vacuum enclosure or at the station. According to an embodiment, one type of sealing device is configured to seal the unsealed IGUs by filling the one or more IGU passages with a sealant. According to an embodiment, one type of sealing device is configured to seal the unsealed IGUs by plugging the one or more IGU passages with a rivet. According to an embodiment, one type of sealing device is configured to seal the unsealed IGUs by applying a patch or a piece of tape over the inlet(s) to the one or more IGU passages. In one embodiment, the sealing device and filling device are the same device. In one embodiment, the sealing device and the filling device are separate devices.

Similar to the embodiments discussed herein, FIGS. 46-53 of the CIP application illustrate a system and method steps for filling an IGU through an IGU passage defined in the spacer, and are incorporated herein by reference in their entirety.

The filling device 4640 of FIGS. 50-53 could be used in the system described herein to fill and seal. In some examples, a separate sealing device is provided in addition to the filling device. In one example, a filling device or filling head is attached to an automatic actuator, while a separate sealing device or sealing head is attached to the same automatic actuator as the filling device. In some examples, the filling device defines both a filling passage for providing a first gas and a sealing passage for providing a sealant material or sealing structure.

Where the filling device also defines a sealing passage, the sealing passage has the same outlet as the filling passage 4641 in some embodiments. In other examples, the sealing passage has a separate sealing outlet for the sealant material or sealant structure to exit the sealant passage. In some examples, after filling the interpane space through the filling passage while the filling passage and IGU passage are in fluid communication, the filling device then moves automatically so that the sealing passage and IGU passage are in fluid communication so that the sealant material or sealant structure can be delivered to the hole.

The sealing device and filling device can have a sealing surface or surfaces surrounding the sealing passage outlet, the filling passage outlet or both, to facilitate a seal with the IGU passage of the sheet or spacer frame.

The CIP application describes movement options for the filling device, including being configured to move automatically using an actuator.

Embodiments can be directed to assembling, evacuating, filling, sealing, and/or taking other actions on one or more IGUs. Accordingly, figures and descriptions herein directed to a single IGU can often apply to multiple IGUs at the same time. In addition, operations that can be performed on multiple IGUs at the same time can also be performed on a single IGU at a time.

The embodiments of the present technology described herein are not intended to be exhaustive or to limit the technology to the precise forms disclosed in the following detailed description. Rather, the embodiments are chosen and described so that others skilled in the art can appreciate and understand the principles and practices of the present technology.

All publications and patents mentioned herein are hereby incorporated by reference. The publications and patents disclosed herein are provided solely for their disclosure. Nothing herein is to be construed as an admission that the inventors are not entitled to antedate any publication and/or patent, including any publication and/or patent cited herein.

Throughout the drawings and description, like reference numbers are used to refer to similar or identical parts.

It should be noted that, as used in this specification and the appended claims, the singular forms "a," "an," and "the" include plural referents unless the content clearly dictates otherwise. Thus, for example, reference to a composition containing "a compound" includes a mixture of two or more compounds. It should also be noted that the term "or" is generally employed in its sense including "and/or" unless the content clearly dictates otherwise.

It should also be noted that, as used in this specification and the appended claims, the phrase "configured" describes a system, apparatus, or other structure that is constructed or configured to perform a particular task or adopt a particular configuration to. The phrase "configured" can be used interchangeably with other similar phrases such as arranged and configured, constructed and arranged, constructed, manufactured and arranged, and the like.

All publications and patent applications in this specification are indicative of the level of ordinary skill in the art to which this technology pertains. All publications and patent applications are herein incorporated by reference to the same extent as if each individual publication or patent application was specifically and individually indicated by reference.

The technology has been described with reference to various specific and preferred embodiments and techniques. However, it should be understood that many variations and modifications may be made while remaining within the spirit and scope of the technology.

The invention claimed is:

1. A system for manufacturing a sealed insulating glass unit (IGU), comprising:
   a conveyor system configured to receive an unsealed IGU assembly, the unsealed IGU assembly comprising first and second sheets of glass material and at least one spacer frame between the first and second sheets and sealed to at least one of the first and second sheets, the unsealed IGU assembly defining an interpane space and an IGU passage providing fluid communication between the interpane space and an environment external to the interpane space; and
   a filling device defining a filling passage and being configured to introduce a gas into the interpane space through the IGU passage using the filling device and the filling device defining a sealing passage configured to deliver a sealing material or structure to the IGU passage to seal the interpane space, wherein the filling passage and the sealing passage are defined on a single head, wherein the filling passage and the sealing passage terminate at a single common outlet.

2. The system of claim 1, wherein the filling device comprises a rigid conduit that is configured to provide a rivet comprising a base portion and a cap portion, wherein the rivet comprises sealant material on the cap portion.

3. The system of claim 1, wherein the filling device further defines a gas inlet and a sealing material inlet, wherein the gas inlet and the sealing material inlet are both in communication with the single outlet.

4. The system of claim 1 wherein the filling device defines:
   a gas inlet in communication with a gas outlet;
   a sealing material inlet in communication with a sealing material outlet; and
   an actuator configured to shift the filling device between a disengaged position where the filling device is not in contact with the unsealed IGU assembly, a filling position where the gas outlet is positioned to introduce a gas into the interpane space through the IGU passage, and a sealing position where the filling device is positioned to seal to the IGU passage.

5. The system of claim 1 further comprising:
   a first plate;
   a second plate; and
   an actuator coupled to the first or second plate;
   wherein the first plate and the second plate are moveable relative to each other and are configured to secure the unsealed IGU assembly between the first plate and the second plate;
   wherein the filling device is coupled to the actuator and the actuator is configured to move the filling device relative to the first plate and the second plate.

6. A system for manufacturing a sealed insulating glass unit (IGU), comprising:
   a vacuum enclosure defining an interior and having a conveyor system, the interior and conveyor system configured to receive an unsealed IGU assembly, the unsealed IGU assembly comprising first and second sheets of glass material and at least one spacer frame between the first and second sheets and sealed to at least one of the first and second sheets, the unsealed IGU assembly defining an interpane space and an IGU passage providing fluid communication between the interpane space and the interior of the vacuum enclosure; and
   a filling device within the vacuum enclosure and defining a filling passage, the filling device configured to be moved automatically to a first position next to the IGU passage and to introduce a gas into the interpane space through the IGU passage using the filling device; and
   wherein the system is further configured to deliver a sealing material or sealing structure to the IGU passage through a sealing passage defined in the filling device to seal the interpane space within the vacuum enclosure, wherein the filling device comprises a single head, wherein the single head is configured to introduce the gas into the interpane space and to deliver the sealing material or sealing structure, wherein the filling passage and the sealing passage terminate at a single common outlet.

7. The system of claim 6 wherein the sealing material or sealing structure is selected from the group consisting of sealant, a rivet, a patch, and tape.

8. The system of claim 6, wherein the filling device comprises a rigid conduit that is configured to provide a rivet comprising a base portion and a cap portion, wherein the rivet comprises sealant material on the cap portion.

9. The system of claim 6, wherein the filling device further defines a gas inlet and a sealing material inlet, wherein the gas inlet and the sealing material inlet are both in communication with the single outlet.

10. The system of claim 6 wherein the filling device defines:
    a gas inlet in communication with a gas outlet;
    a sealing material inlet in communication with a sealing material outlet; and
    an actuator configured to shift the filling device between a disengaged position where the filling device is not in contact with the unsealed IGU assembly, a filling position where the gas outlet is positioned to introduce a gas into the interpane space through the IGU passage, and a sealing position where the filling device is positioned to seal to the IGU passage.

11. The system of claim 6 wherein the filling device is configured to automatically deliver the sealing material or sealing structure.

12. The system of claim 6 wherein the unsealed IGU assembly is selected from the group consisting of a double pane unsealed IGU assembly and a triple pane unsealed IGU assembly.

13. The system of claim 6 wherein the IGU passage is defined in the spacer frame.

14. The system of claim 6 further comprising:
a first plate;
a second plate; and
an actuator coupled to the first or second plate;
wherein the first plate and the second plate are moveable relative to each other and are configured to secure the unsealed IGU assembly between the first plate and the second plate;
wherein the filling device is coupled to the actuator and the actuator is configured to move the filling device relative to the first plate and the second plate.

* * * * *